US010582478B2

(12) United States Patent
Takahashi et al.

(10) Patent No.: US 10,582,478 B2
(45) Date of Patent: Mar. 3, 2020

(54) TERMINAL DEVICE, BASE STATION DEVICE, COMMUNICATION METHOD, AND INTEGRATED CIRCUIT

(71) Applicant: SHARP KABUSHIKI KAISHA, Sakai, Osaka (JP)

(72) Inventors: Hiroki Takahashi, Sakai (JP); Shoichi Suzuki, Sakai (JP); Tatsushi Aiba, Sakai (JP); Kazunari Yokomakura, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/741,340

(22) PCT Filed: Jun. 29, 2016

(86) PCT No.: PCT/JP2016/069316
§ 371 (c)(1),
(2) Date: Jan. 2, 2018

(87) PCT Pub. No.: WO2017/006828
PCT Pub. Date: Jan. 12, 2017

(65) Prior Publication Data
US 2018/0192415 A1  Jul. 5, 2018

(30) Foreign Application Priority Data

Jul. 8, 2015 (JP) .................. 2015-136568

(51) Int. Cl.
*H04W 72/04* (2009.01)
*H04W 24/10* (2009.01)
(Continued)

(52) U.S. Cl.
CPC ....... *H04W 72/0413* (2013.01); *H04L 5/0032* (2013.01); *H04L 5/0053* (2013.01);
(Continued)

(58) Field of Classification Search
CPC . H04W 72/0413; H04W 72/14; H04W 24/10; H04W 72/04; H04L 5/0032; H04L 5/0053
See application file for complete search history.

(56) References Cited

U.S. PATENT DOCUMENTS

2014/0010126 A1* 1/2014 Sayana ................. H04J 3/1694
370/280
2014/0036664 A1* 2/2014 Han ........................ H04W 4/70
370/230
(Continued)

FOREIGN PATENT DOCUMENTS

JP  2013-110657 A  6/2013
JP  2014-033314 A  2/2014
(Continued)

OTHER PUBLICATIONS

"3rd Generation Partnership Project; Technical Specification Group Radio Access Network; Evolved Universal Terrestrial Radio Access (E-UTRA); Physical layer procedures (Release 10)", 3GPP TS 36.213, No. V10.1.0, Mar. 30, 2011, pp. 1-115.
(Continued)

*Primary Examiner* — Lakeram Jangbahadur
(74) *Attorney, Agent, or Firm* — ScienBiziP, P.C.

(57) ABSTRACT

To efficiently report channel state information in an uplink. A terminal device includes a transmission unit which reports CSI for multiple subframe sets in a first serving cell and CSI for a second serving cell, first CSIs for some of multiple subframe sets for the first serving cell being reported on a PUCCH with a first format, and second CSI for the rest of multiple subframe sets for the first serving cell being reported on a PUCCH with the first format, and in a case that in a certain subframe, the second CSI report collides with the CSI report in the second serving cell, the second CSI and the
(Continued)

CSI for the second serving cell being reported on the PUCCH with a second format.

4 Claims, 9 Drawing Sheets

(51) Int. Cl.
*H04L 5/00* (2006.01)
*H04W 72/14* (2009.01)

(52) U.S. Cl.
CPC .......... *H04W 24/10* (2013.01); *H04W 72/04* (2013.01); *H04W 72/14* (2013.01)

(56) References Cited

U.S. PATENT DOCUMENTS

| | | | |
|---|---|---|---|
| 2014/0092787 A1* | 4/2014 | Han | H04W 4/70 370/280 |
| 2014/0328304 A1 | 11/2014 | Suzuki et al. | |
| 2014/0376424 A1* | 12/2014 | Seo | H04L 1/0026 370/280 |
| 2015/0195830 A1* | 7/2015 | Takeda | H04W 24/10 370/329 |

FOREIGN PATENT DOCUMENTS

| | | |
|---|---|---|
| JP | 2015-512174 A | 4/2015 |
| WO | 2014/022032 A1 | 2/2014 |

OTHER PUBLICATIONS

"Evolved Universal Terrestrial Radio Access (EUTRA); Physical channels and modulation (Release 12)"; Jan. 6, 2015; 3GPP TS 36.211 V12.4.0 (Dec. 2014).
"Evolved Universal Terrestrial Radio Access (EUTRA); Multiplexing and channel coding (Release 12)", Jan. 6, 2015; 3GPP TS 36.212 V12.3.0 (Dec. 2014).
"Evolved Universal Terrestrial Radio Access (EUTRA); Physical layer procedures (Release 12)", Jan. 7, 2015; 3GPP TS 36.213 V12.4.0 (Dec. 2014).
"Evolved Universal Terrestrial Radio Access (EUTRA); Medium Access Control (MAC) protocol specification (Release 12)", Jan. 5, 2015; 3GPP TS 36.321 V12.4.0 (Dec. 2014).
"Evolved Universal Terrestrial Radio Access (EUTRA); Radio Resource Control (RRC); Protocol specification (Release 12)", Jan. 7, 2015; 3GPP TS 36.331 V12.4.1 (Dec. 2014).
"New WI proposal: LTE Carrier Aggregation Enhancement Beyond 5 Carriers", Dec. 8-11, 2014; RP-142286; Nokia Corporation et al.; 3GPP TSG RAN Meeting #66, Hawaii, United States of America.

* cited by examiner

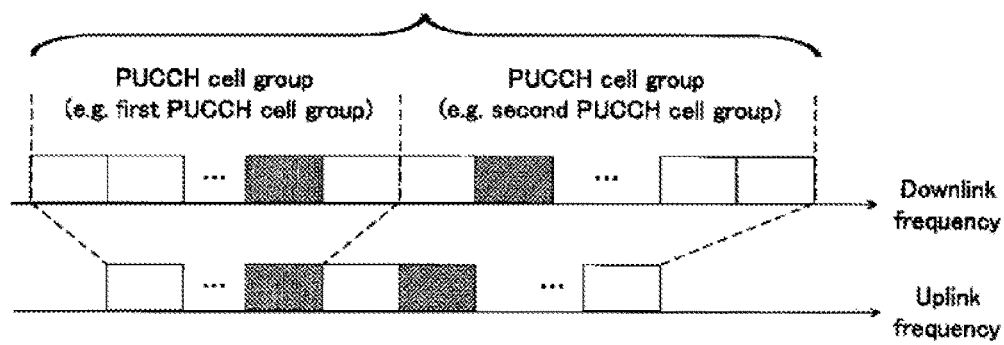
FIG. 3A Example 1
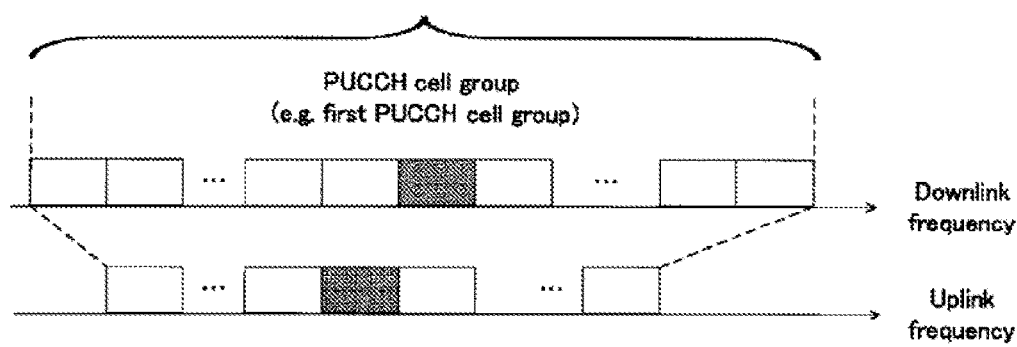
FIG. 3B Example 2
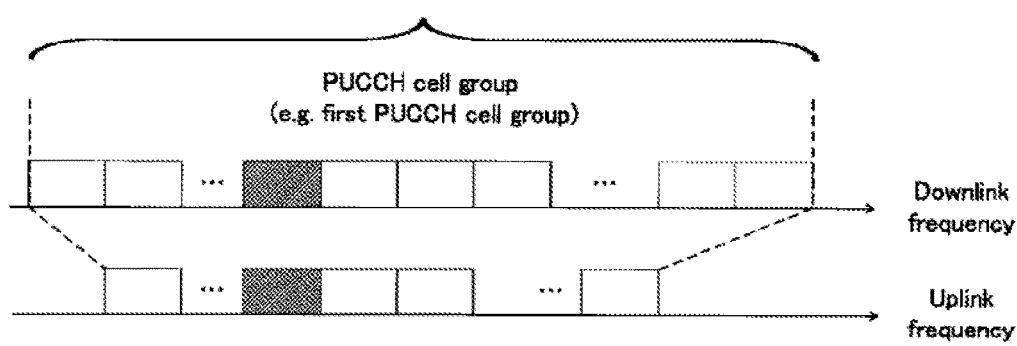
FIG. 3C Example 3

TERMINAL DEVICE, BASE STATION DEVICE, COMMUNICATION METHOD, AND INTEGRATED CIRCUIT

TECHNICAL FIELD

The present invention relates to a terminal device, a base station device, a communication method, and an integrated circuit. This application claims priority based on Japanese Patent Application No. 2015-136568 filed on Jul. 8, 2015, the contents of which are incorporated herein by reference.

BACKGROUND ART

In the 3rd Generation Partnership Project (3GPP), a radio access method and a radio network for cellular mobile communications (hereinafter, referred to as "Long Term Evolution (LTE)", or "Evolved Universal Terrestrial Radio Access (EUTRA)") have been considered (NPL 1, NPL 2, NPL 3, NPL 4, and NPL 5). In LTE, a base station device is also referred to as an evolved NodeB (eNodeB), and a terminal device is also referred to as User Equipment (UE) or a mobile station device. LTE is a cellular communication system in which an area is divided into multiple cells to form a cellular pattern, each of the cells being served by a base station device. A single base station device may manage multiple cells.

LTE supports a Time Division Duplex (TDD). LTE that employs a TDD scheme is also referred to as TD-LTE or LTE TDD. In TDD, an uplink signal and a downlink signal are time-division multiplexed. LTE supports a Frequency Division Duplex (FDD).

In 3GPP, Carrier Aggregation (CA) has been specified in which a terminal device can simultaneously perform transmission and/or reception on up to five serving cells (component carriers: CC).

In 3GPP, a configuration where a terminal device simultaneously performs transmission and/or reception on more than five serving cells (component carriers) has been considered. Furthermore, a configuration where a terminal device performs transmission on a Physical Uplink Control CHannel (PUCCH) in a secondary cell that is a serving cell other than a primary cell has been considered (NPL 6).

In 3GPP, a configuration where a new format for the PUCCH and/or a Physical Uplink Shared CHannel (PUSCH) is used to simultaneously transmit Channel State Information (CSI) of multiple serving cells has been considered.

CITATION LIST

NPL 1: "3GPP TS 36.211 V12.4.0 (2014-12) Evolved Universal Terrestrial Radio Access (E-UTRA); Physical channels and modulation (Release 12)", 6 Jan. 2015.

NPL 2: "3GPP TS 36.212 V12.3.0 (2014-12) Evolved Universal Terrestrial Radio Access (E-UTRA); Multiplexing and channel coding (Release 12)", 6 Jan. 2015.

NPL 3: "3GPP TS 36.213 V12.4.0 (2014-12) Evolved Universal Terrestrial Radio Access (E-UTRA); Physical layer procedures (Release 12)", 7 Jan. 2015.

NPL 4: "3GPP TS 36.321 V12.4.0 (2014-12) Evolved Universal Terrestrial Radio Access (E-UTRA); Medium Access Control (MAC) protocol specification (Release 12)", 5 Jan. 2015.

NPL 5: "3GPP TS 36.331 V12.4.1 (2014-12) Evolved Universal Terrestrial Radio Access (E-UTRA); Radio Resource Control (RRC); Protocol specification (Release 12)", 7 Jan. 2015.

NPL 6: "New WI proposal: LTE Carrier Aggregation Enhancement Beyond 5 Carriers", RP-142286, Nokia Corporation, NTT DoCoMo Inc., Nokia Networks, 3GPP TSG RAN Meeting #66, Hawaii, United States of America, 8-11 Dec. 2014.

DISCLOSURE OF THE INVENTION

Problems to be Solved by the Invention

An object of the present invention is to provide a terminal device, a base station device, a communication method, and an integrated circuit, which enable the base station device and the terminal device to efficiently communicate with each other in the radio communication system as described above.

Means for Solving the Problems (1) In order to accomplish the object described above, aspects of the present invention are contrived to provide the following means. To be more specific, a terminal device in one aspect of the present invention may be a terminal device including a transmission unit which reports channel state information for multiple subframe sets in a first serving cell and channel state information in a second serving cell, wherein first channel state information for some of multiple subframe sets in the first serving cell is reported on a physical uplink control channel with a first format, and second channel state information for the rest of multiple subframe sets in the first serving cell is reported on a physical uplink control channel with the first format, and in a case that in a certain subframe, the second channel state information report collides with the channel state information report in the second serving cell, the second channel state information and the channel state information in the second serving cell may be reported on the physical uplink control channel with a second format.

(2) A terminal device in one aspect of the present invention may be a terminal device including a reception unit which receives first information indicating a first physical uplink control channel resource with a first format and second information indicating a second physical uplink control channel resource with a second format, and a transmission unit which reports first channel state information for some of multiple subframe sets in a first serving cell on the first physical uplink control channel and reports second channel state information for the rest of multiple subframe sets in the first serving cell on the second physical uplink control channel, and in a case that in a certain subframe, the first channel state information report on the first physical uplink control channel collides with the second channel state information report on the second physical uplink control channel, the first channel state information and the second channel state information may be reported on the second physical uplink control channel with the second format.

(3) A terminal device in one aspect of the present invention may be a terminal device including a reception unit which receives first information indicating a first physical uplink control channel resource with a first format and second information indicating a second physical uplink control channel resource with a second format, and a transmission unit which reports first channel state information for some of multiple subframe sets in a first serving cell on the first physical uplink control channel and reports second channel state information for the rest of multiple subframe sets in the first serving cell on the second physical uplink control channel, and in a case that in a certain subframe, the first channel state information report on the first physical uplink control channel collides with the second channel state information report on the second physical uplink control channel, the first channel state information and the second channel state information may be reported on the second physical uplink control channel with the second format.

(4) A base station device in one aspect of the present invention may be a base station device including a reception unit which receives a channel state information report for multiple subframe sets in a first serving cell and a channel state information report in a second serving cell, wherein first channel state information for some of multiple subframe sets in the first serving cell is reported on a physical uplink control channel with a first format, and second channel state information for the rest of multiple subframe sets in the first serving cell is reported on a physical uplink control channel with the first format, and in a case that in a certain subframe, the second channel state information report collides with the channel state information report in the second serving cell, the second channel state information and the channel state information in the second serving cell may be reported on the physical uplink control channel with a second format.

(5) A base station device in one aspect of the present invention may be a base station device including a transmission unit which transmits first information indicating a first physical uplink control channel resource with a first format and second information indicating a second physical uplink control channel resource with a second format, and a reception unit which receives first channel state information report for some of multiple subframe sets in a first serving cell on the first physical uplink control channel and receives second channel state information report for the rest of multiple subframe sets in the first serving cell on the second physical uplink control channel, and in a case that in a certain subframe, the first channel state information report on the first physical uplink control channel collides with the second channel state information report on the second physical uplink control channel, the first channel state information and the second channel state information may be reported on the second physical uplink control channel with the second format.

(6) A base station device in one aspect of the present invention may be a base station device including a transmission unit which transmits first information indicating a first physical uplink control channel resource with a first format, second information indicating a second physical uplink control channel resource with the first format, and third information indicating a third physical uplink control channel resource with a second format, and a reception unit which receives first channel state information report for some of multiple subframe sets in a first serving cell on the first physical uplink control channel and receives second channel state information report for the rest of multiple subframe sets in the first serving cell on the second physical uplink control channel, and in a case that in a certain subframe, the first channel state information report collides with the second channel state information report, the first channel state information and the second channel state information may be reported on the third physical uplink control channel with the second format.

(7) A communication method in one aspect of the present invention may be a communication method of a terminal device, the communication method including reporting channel state information for multiple subframe sets in a first serving cell and channel state information in a second serving cell, wherein first channel state information for some of multiple subframe sets in the first serving cell is reported on a physical uplink control channel with a first format, and second channel state information for the rest of multiple subframe sets in the first serving cell is reported on a physical uplink control channel with the first format, and in a case that in a certain subframe, the second channel state information report collides with the channel state information report in the second serving cell, the second channel state information and the channel state information in the second serving cell may be reported on the physical uplink control channel with a second format.

(8) A communication method in one aspect of the present invention may be a communication method of a terminal device, the communication method including receiving first information indicating a first physical uplink control channel resource with a first format and second information indicating a second physical uplink control channel resource with a second format, reporting first channel state information for some of multiple subframe sets in a first serving cell on the first physical uplink control channel, and reporting second channel state information for the rest of multiple subframe sets in the first serving cell on the second physical uplink control channel, wherein in a case that in a certain subframe, the first channel state information report on the first physical uplink control channel collides with the second channel state information report on the second physical uplink control channel, the first channel state information and the second channel state information may be reported on the second physical uplink control channel with the second format.

(9) A communication method in one aspect of the present invention may be a communication method of a terminal device, the communication method including receiving first information indicating a first physical uplink control channel resource with a first format, second information indicating a second physical uplink control channel resource with the first format, and third information indicating a third physical uplink control channel resource with a second format, reporting first channel state information for some of multiple subframe sets in a first serving cell on the first physical uplink control channel, and reporting second channel state information for the rest of multiple subframe sets in the first serving cell on the second physical uplink control channel, wherein in a case that in a certain subframe, the first channel state information report collides with the second channel state information report, the first channel state information and the second channel state information may be reported on the third physical uplink control channel with the second format.

(10) A communication method in one aspect of the present invention may be a communication method of a base station device, the communication method including receiving a channel state information report for multiple subframe sets in a first serving cell and a channel state information report in a second serving cell, wherein first channel state information for some of multiple subframe sets in the first serving cell is reported on a physical uplink control channel with a first format, and second channel state information for the rest of multiple subframe sets in the first serving cell is reported on a physical uplink control channel with the first format, and in a case that in a certain subframe, the second channel state information report collides with the channel state information report in the second serving cell, the second channel state information and the channel state information in the second serving cell may be reported on the physical uplink control channel with a second format.

(11) A communication method in one aspect of the present invention may be a communication method of a base station device, the communication method including transmitting first information indicating a first physical uplink control channel resource with a first format and second information indicating a second physical uplink control channel resource with a second format, receiving a first channel state information report for some of multiple subframe sets in a first serving cell on the first physical uplink control channel, and receiving a second channel state information report for the rest of multiple subframe sets in the first serving cell on the second physical uplink control channel, wherein in a case that in a certain subframe, the first channel state information report on the first physical uplink control channel collides with the second channel state information report on the second physical uplink control channel, the first channel state information and the second channel state information may be reported on the second physical uplink control channel with the second format.

(12) A communication method in one aspect of the present invention may be a communication method of a base station device, the communication method including transmitting first information indicating a first physical uplink control channel resource with a first format, second information indicating a second physical uplink control channel resource with the first format, and third information indicating a third physical uplink control channel resource with a second format, receiving a first channel state information report for some of multiple subframe sets in a first serving cell on the first physical uplink control channel, and receiving a second channel state information report for the rest of multiple subframe sets in the first serving cell on the second physical uplink control channel, wherein in a case that in a certain subframe, the first channel state information report collides with the second channel state information report, the first channel state information and the second channel state information may be reported on the third physical uplink control channel with the second format.

(13) An integrated circuit in one aspect of the present invention may be an integrated circuit mounted on a terminal device, causing the terminal device to exert a function to report channel state information for multiple subframe sets in a first serving cell and channel state information in a second serving cell, wherein first channel state information for some of multiple subframe sets in the first serving cell is reported on a physical uplink control channel with a first format, and second channel state information for the rest of multiple subframe sets in the first serving cell is reported on a physical uplink control channel with the first format, and in a case that in a certain subframe, the second channel state information report collides with the channel state information report in the second serving cell, the second channel state information and the channel state information in the second serving cell may be reported on the physical uplink control channel with a second format.

(14) An integrated circuit in one aspect of the present invention may be an integrated circuit mounted on a terminal device, causing the terminal device to exert a function to receive first information indicating a first physical uplink control channel resource with a first format and second information indicating a second physical uplink control channel resource with a second format, and a function to report first channel state information for some of multiple subframe sets in a first serving cell on the first physical uplink control channel and report second channel state information for the rest of multiple subframe sets in the first serving cell on the second physical uplink control channel, wherein in a case that in a certain subframe, the first channel state information report on the first physical uplink control channel collides with the second channel state information report on the second physical uplink control channel, the first channel state information and the second channel state information may be reported on the second physical uplink control channel with the second format.

(15) An integrated circuit in one aspect of the present invention may be an integrated circuit mounted on a terminal device, causing the terminal device to exert a function to receive first information indicating a first physical uplink control channel resource with a first format, second information indicating a second physical uplink control channel resource with the first format, and third information indicating a third physical uplink control channel resource with a second format, and a function to report first channel state information for some of multiple subframe sets in a first serving cell on the first physical uplink control channel and report second channel state information for the rest of multiple subframe sets in the first serving cell on the second physical uplink control channel, wherein in a case that in a certain subframe, the first channel state information report collides with the second channel state information report, the first channel state information and the second channel state information may be reported on the third physical uplink control channel with the second format.

(16) An integrated circuit in one aspect of the present invention may be an integrated circuit mounted on a base station device, causing the base station device to exert a function to receive a channel state information report for multiple subframe sets in a first serving cell and a channel state information report in a second serving cell, wherein first channel state information for some of multiple subframe sets in the first serving cell is reported on a physical uplink control channel with a first format, and second channel state information for the rest of multiple subframe sets in the first serving cell is reported on a physical uplink control channel with the first format, and in a case that in a certain subframe, the second channel state information report collides with the channel state information report in the second serving cell, the second channel state information and the channel state information in the second serving cell may be reported on the physical uplink control channel with a second format.

(17) An integrated circuit in one aspect of the present invention may be an integrated circuit mounted on a base station device, causing the base station device to exert a function to transmit first information indicating a first physical uplink control channel resource with a first format and second information indicating a second physical uplink control channel resource with a second format, and a function to receive a first channel state information report for some of multiple subframe sets in a first serving cell on the first physical uplink control channel and receive a second channel state information report for the rest of multiple subframe sets in the first serving cell on the second physical uplink control channel, wherein in a case that in a certain subframe, the first channel state information report on the first physical uplink control channel collides with the second channel state information report on the second physical uplink control channel, the first channel state information and the second channel state information may be reported on the second physical uplink control channel with the second format.

(18) An integrated circuit in one aspect of the present invention may be an integrated circuit mounted on a base station device, causing the base station device to exert a function to transmit first information indicating a first physical uplink control channel resource with a first format, second information indicating a second physical uplink control channel resource with the first format, and third information indicating a third physical uplink control channel resource with a second format, and a function to receive a first channel state information report for some of multiple subframe sets in a first serving cell on the first physical uplink control channel and receive a second channel state information report for the rest of multiple subframe sets in the first serving cell on the second physical uplink control channel, wherein in a case that in a certain subframe, the first channel state information report collides with the second channel state information report, the first channel state information and the second channel state information may be reported on the third physical uplink control channel with the second format.

Effects of the Invention

According to the present invention, a base station device and terminal device can efficiently communicate with each other.

BRIEF DESCRIPTION OF THE DRAWINGS

FIGS. 3A to 3C are diagrams illustrating PUCCH cell groups according to the present embodiment.

MODE FOR CARRYING OUT THE INVENTION

Hereinafter, embodiments of the present invention will be described below.

Figure 1:
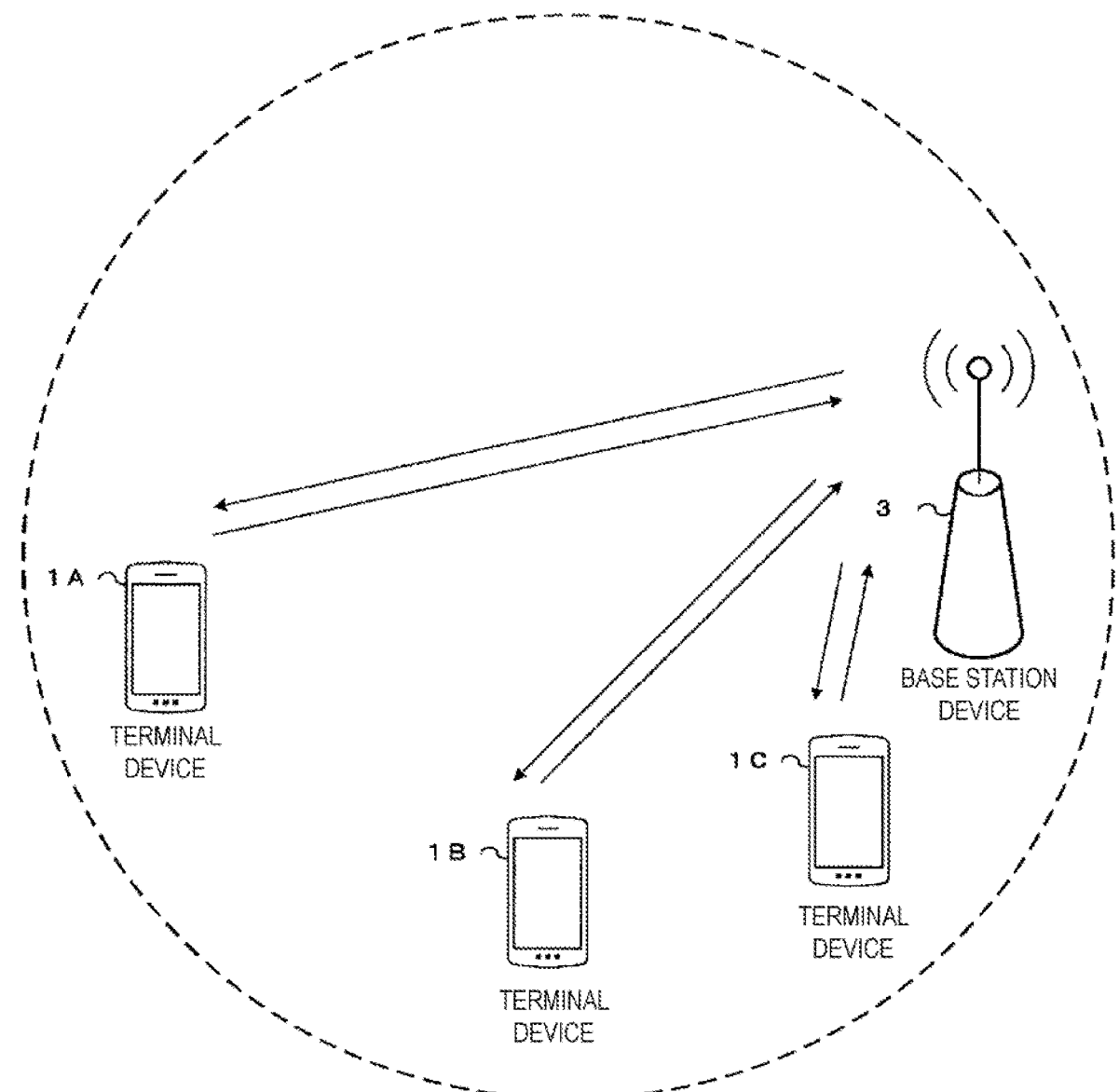
FIG. 1 is a diagram illustrating a concept of a radio communication system according to the present embodiment.

FIG. 1 is a conceptual diagram of a radio communication system according to the present embodiment. In FIG. 1, the radio communication system includes terminal devices 1A to 1C and a base station device 3. Hereinafter, each of the terminal devices 1A to 1C is referred to as a terminal device 1.

Physical channels and physical signals according to the present embodiment will be described.

In FIG. 1, uplink radio communication from the terminal device 1 to the base station device 3 uses the following uplink physical channels. Here, the uplink physical channels are used to transmit information output from higher layers.

Physical Uplink Control Channel (PUCCH)
Physical Uplink Shared Channel (PUSCH)
Physical Random Access Channel (PRACH)

The PUCCH is used to transmit Uplink Control Information (UCI). Here, the uplink control information may include Channel State Information (CSI) used to indicate a downlink channel state. The uplink control information may include a Scheduling Request (SR) used to request an UL-SCH resource. The uplink control information may include a Hybrid Automatic Repeat request ACKnowledgement (HARQ-ACK). The HARQ-ACK may indicate HARQ-ACK for downlink data (Transport block, Medium Access Control Protocol Data Unit (MAC PDU), Downlink-Shared Channel (DL-SCH), or Physical Downlink Shared Channel (PDSCH)).

In other words, the HARQ-ACK may indicate an acknowledgement (ACK) or a negative-acknowledgement (NACK). Here, the HARQ-ACK may also be referred to as an ACK/NACK, HARQ feedback, a HARQ acknowledgement, HARQ information, or HARQ control information.

However, the channel state information (CSI) includes a Channel Quality Indicator (CQI), a Precoding Matrix Indicator (PMI, Precoding Marix Indicator), a Precoding Type Indicator (PTI), and/or a Rank Indicator (RI).

The channel state information may be periodically or aperiodically reported from the terminal device 1 to the base station device 3 with a prescribed period. The reported CSI is referred to CSI report, specifically, the CSI periodically reported is referred to periodic channel state information (periodic CSI) or periodic CSI report, and the CSI aperiodically reported is referred to as aperiodic channel state information (aperiodic CSI) or aperiodic CSI report.

The PUSCH is used to transmit uplink data (Uplink-Shared Channel (UL-SCH)). Furthermore, the PUSCH may be used to transmit the HARQ-ACK and/or the CSI along with the uplink data. Furthermore, the PUSCH may be used to transmit the CSI only or the HARQ-ACK and CSI only. In other words, the PUSCH may be used to transmit the uplink control information only.

Here, the base station device 3 and the terminal device 1 communicate a signal in (transmit and receive a signal to and from) the higher layer. For example, the base station device 3 and the terminal device 1 may transmit and receive Radio Resource Control (RRC) signaling (also referred to as an RRC message, RRC information) in an RRC layer. The base station device 3 and the terminal device 1 may transmit and receive a Medium Access Control (MAC) control element in a MAC layer. Here, the RRC signaling and/or MAC control element is also referred to as higher layer signaling.

The PUSCH may be used to transmit the RRC signaling and the MAC control element. Here, the RRC signaling transmitted from the base station device 3 may be signaling common to multiple terminal devices 1 in a cell. The RRC signaling transmitted from the base station device 3 may be signaling dedicated to a certain terminal device 1 (also referred to as dedicated signaling). In other words, terminal device-unique (UE-specific) information may be transmitted through signaling dedicated to a certain terminal device 1.

The PRACH is used to transmit a random access preamble. The PRACH may be used for an initial connection establishment procedure, a handover procedure, a connection re-establishment procedure, uplink transmission synchronization (timing adjustment), and indicating a PUSCH resource request.

In FIG. 1, the following uplink physical signal is used in the uplink radio communication. Here, the uplink physical signal is not used to transmit information output from the higher layers but is used by a physical layer.

Uplink Reference Signal (UL RS)

According to the present embodiment, the following two types of uplink reference signals are used.

Demodulation Reference Signal (DMRS)

Sounding Reference Signal (SRS)

The DMRS is associated with transmission on the PUSCH or the PUCCH. The DMRS is time-multiplexed with the PUSCH or the PUCCH. The base station device 3 uses the DMRS in order to perform channel compensation on the PUSCH or the PUCCH. Transmission on both the PUSCH and the DMRS is hereinafter referred to simply as transmission on the PUSCH. Transmission on both the PUCCH and the DMRS is hereinafter referred to simply as transmission on the PUCCH.

The SRS has no association with transmission on the PUSCH or the PUCCH. The base station device 3 uses the SRS in order to measure an uplink channel state.

In FIG. 1, the following downlink physical channels are used for downlink radio communication from the base station device 3 to the terminal device 1. Here, the downlink physical channel is used to transmit the information output from higher layers.

Physical Broadcast Channel (PBCH)

Physical Control Format Indicator Channel (PCFICH)

Physical Hybrid automatic repeat request Indicator Channel (PHICH)

Physical Downlink Control Channel (PDCCH)

Enhanced Physical Downlink Control Channel (EPDCCH)

Physical Downlink Shared Channel (PDSCH)

Physical Multicast Channel (PMCH)

The PBCH is used to broadcast a Master Information Block (MIB), or a Broadcast Channel (BCH), that is shared by the terminal devices 1.

The PCFICH is used to transmit information indicating a region (OFDM symbols) to be used for transmission on the PDCCH.

The PHICH is used to transmit a HARQ indicator (HARQ feedback or response information) indicating an ACKnowledgement (ACK) or a Negative ACKnowledgement (NACK) with respect to the uplink data (Uplink Shared Channel (UL-SCH)) received by the base station device 3.

The PDCCH and the EPDCCH are used to transmit Downlink Control Information (DCI). Here, multiple DCI formats are defined for transmission of the downlink control information. In other words, a field for the downlink control information is defined in a DCI format and is mapped to information bits.

For example, as the downlink DCI formats, DCI formats (e.g., DCI format 1A and DCI format 1C) to be used for the scheduling of one PDSCH in one cell (transmission of a single downlink transport block) may be defined.

Here, each of the downlink DCI formats includes information on the scheduling of the PDSCH. For example, the downlink DCI format includes downlink control information such as a Carrier Indicator Field (CIF), information on resource block assignment, information on a Modulation and Coding Scheme (MCS), and information (Precoding information) for indicating the number of transmission layers in the PUSCH transmission. Here, the downlink DCI format is also referred to as downlink grant or downlink assignment.

Furthermore, for example, as DCI formats for uplink, DCI formats (e.g., DCI format 0 and DCI format 4) to be used for the scheduling of one PUSCH in one cell (transmission of a single uplink transport block) is defined.

Here, each of the uplink DCI formats includes information on the scheduling of the PUSCH. For example, the uplink DCI format includes downlink control information such as a Carrier Indicator Field (CIF), information on Resource block assignment and/or hopping resource allocation, information on Modulation and coding scheme (MCS) and/or redundancy version, or information (Precoding information and the number of layers) used for indicating the number of transmission layers in the PUSCH transmission. Here, the uplink DCI format is also referred to as uplink grant or Uplink assignment.

In a case that a PDSCH resource is scheduled in accordance with the downlink assignment, the terminal device 1 may receive downlink data on the scheduled PDSCH. In a case that a PUSCH resource is scheduled in accordance with the uplink grant, the terminal device 1 may transmit uplink data and/or uplink control information on the scheduled PUSCH.

In the present embodiment, the PDCCH and the EPDCCH are also collectively referred to simply as a PDCCH. In the present embodiment, a PDCCH candidate and an EPDCCH candidate are also collectively referred to simply as a PDCCH candidate.

Here, an RNTI assigned to the terminal device 1 by the base station device 3 is used for the transmission of the downlink control information (transmission on the PDCCH). Specifically, Cyclic Redundancy check (CRC) parity bits are attached to the DCI format (or downlink control information), and after the attachment, the CRC parity bits are scrambled with the RNTI. Here, the CRC parity bits attached to the DCI format may be obtained from a payload of the associated DCI format.

The terminal device 1 attempts to decode the DCI format to which the CRC parity bits scrambled with the RNTI have been attached, and detects, as a DCI format destined for the terminal device 1 itself, the DCI format for which the CRC has been successful (also referred to as blind coding). In other words, the terminal device 1 may detect the PDCCH with the CRC scrambled with the RNTI. The terminal device 1 may detect the PDCCH including the DCI format to which the CRC parity bits scrambled with the RNTI have been attached.

Here, the RNTI may include a Cell-Radio Network Temporary Identifier (C-RNTI). The C-RNTI is an identifier unique to the terminal device 1 and used for the identification in RRC connection and scheduling. The C-RNTI may be used for dynamically scheduled unicast transmission.

The RNTI may further include a Semi-Persistent Scheduling C-RNTI (SPS C-RNTI). The SPS C-RNTI is an identifier unique to the terminal device 1 and used for semi-persistent scheduling. The SPS C-RNTI may be used for semi-persistently scheduled unicast transmission.

The RNTI may include a Temporary C-RNTI. Here, the Temporary C-RNTI is an identifier which is used during a contention-based random access procedure and unique to a preamble transmitted by the terminal device 1. The Temporary C-RNTI may be used for dynamically scheduled transmission.

The PDSCH is used to transmit the downlink data (Downlink Shared Channel (DL-SCH)). The PDSCH is used to transmit a system information message. Here, the system information message may be cell-specific (cell-unique) information. The system information is included in the RRC signaling. The PDSCH is used to transmit the RRC signaling and the MAC control element.

The PMCH is used to transmit multicast data (Multicast Channel (MCH)).

In FIG. 1, the following downlink physical signals are used in the downlink radio communication. Here, the downlink physical signals are not used to transmit the information output from the higher layers but is used by the physical layer.

Synchronization signal (SS)
Downlink Reference Signal (DL RS)

The synchronization signal is used in order for the terminal device 1 to be synchronized in terms of frequency and time domains for downlink. In a TDD scheme, the synchronization signal is mapped to subframes 0, 1, 5, and 6 within a radio frame. In a FDD scheme, the synchronization signal is mapped to subframes 0 and 5 within a radio frame.

The downlink reference signal is used in order for the terminal device 1 to perform the channel compensation on the downlink physical channel. The downlink reference signal is used in order for the terminal device 1 to calculate the downlink CSI.

In the present embodiment, the following five types of downlink reference signals are used.

Cell-specific Reference Signal (CRS)
UE-specific Reference Signal (URS) associated with the PDSCH
Demodulation Reference Signal (DMRS) associated with the EPDCCH
Non-Zero Power Channel State Information-Reference Signal (NZP CSI-RS)
Zero Power Channel State Information-Reference Signal (ZP CSI-RS)
Multimedia Broadcast and Multicast Service over Single Frequency Network Reference signal (MBSFN RS)
Positioning Reference Signal (PRS)

Here, the downlink physical channel and the downlink physical signal are collectively referred to as a downlink signal. The uplink physical channel and the uplink physical signal are collectively referred to as an uplink signal. The downlink physical channel and the uplink physical channel are collectively referred to as a physical channel. The downlink physical signal and the uplink physical signal are collectively referred to as a physical signal.

The BCH, the MCH, the UL-SCH, and the DL-SCH are transport channels. A channel used in the Medium Access Control (MAC) layer is referred to as a transport channel. The unit of the transport channel used in the MAC layer is referred to as a transport block (TB) or a MAC Protocol Data Unit (PDU). Control of a Hybrid Automatic Repeat reQuest (HARM) is performed for each transport block in the MAC layer. The transport block is a unit of data that the MAC layer delivers to the physical layer. In the physical layer, the transport block is mapped to a codeword, and coding processing is performed on a codeword-by-codeword basis.

The terminal device 1 switches and uses multiple transmission modes, such as single antenna transmission, transmit diversity, and Multiple Input Multiple Output (MIMO), which are different in a usable transmission method. For example, the transmission mode specified by the base station from among transmission modes 1 to 10 is used. For example, transmission mode 10 is a transmission mode capable of configuring multiple CSI processes.

The carrier aggregation will be described below.

In the present embodiment, one or multiple serving cells may be configured for the terminal device 1. A technology in which the terminal device 1 communicates via multiple serving cells is referred to as carrier aggregation or cell aggregation.

Here, the present embodiment may apply to one or each of the multiple serving cells configured for the terminal device 1. Alternatively, the present embodiment may apply to one or some of the multiple serving cells configured for the terminal device 1. Alternatively, the present embodiment may apply to one or each of the multiple serving cell groups (for example, PUCCH cell groups) configured for the terminal device 1, which will be described below. Alternatively, the present embodiment may apply to one or some of the multiple serving cell groups configured for the terminal device 1.

In the present embodiment, the Time Division Duplex (TDD) and/or Frequency Division Duplex (FDD) may be applied. Here, for carrier aggregation, the TDD or FDD may apply to one or all of the multiple serving cells. Alternatively, serving cells to which the TDD applies and serving cells to which the FDD applies may be aggregated. Here, a frame structure for the FDD is also referred to as Frame structure type 1. A frame structure for the TDD is referred to as Frame structure type 2.

Here, the configured one or multiple serving cells include one primary cell and one or multiple secondary cells. The primary cell may be a serving cell on which an initial connection establishment procedure has been performed, a serving cell in which a connection re-establishment procedure has been started, or a cell indicated as a primary cell during a handover procedure. At a point in time when an RRC connection is established, or later, a secondary cell may be configured.

Here, a carrier corresponding to a serving cell in the downlink is referred to as a downlink component carrier. A carrier corresponding to a serving cell in the uplink is referred to as an uplink component carrier. The downlink component carrier and the uplink component carrier are collectively referred to as a component carrier.

The terminal device 1 may simultaneously perform transmission and/or reception on multiple physical channels in one or multiple serving cells (component carrier(s)). Here, transmission on one physical channel may be performed in one serving cell (component carrier) of the multiple serving cells (component carriers).

Here, the primary cell is used for transmission on the PUCCH. The primary cell is not deactivated. Cross-carrier scheduling does not apply to the primary. In other words, the primary cell is always scheduled via its PDCCH.

In a case that a PDCCH (or PDCCH monitoring) is configured in a certain secondary cell, the cross-carrier scheduling may not apply to the certain secondary cell. In other words, in this case, the secondary cell may be always scheduled via its PDCCH. In a case that no PDCCH (or PDCCH monitoring) is configured in a certain secondary cell, the cross-carrier scheduling applies to the secondary cell, and the certain secondary cell may always be scheduled via the PDCCH in one other serving cell.

Here, in the present embodiment, a secondary cell used for transmission on the PUCCH is referred to as a PUCCH secondary cell or a special secondary cell. A secondary cell not used for transmission on the PUCCH is referred to as a non-PUCCH secondary cell, a non-special secondary cell, a non-PUCCH serving cell, or a non-PUCCH cell. The primary cell and the PUCCH secondary cell are collectively referred to as a PUCCH serving cell and PUCCH cell.

Here, the PUCCH serving cell (primary cell, PUCCH secondary cell) always has the downlink component carrier and the uplink component carrier. A PUCCH resource is configured in the PUCCH serving cell (primary cell, PUCCH secondary cell).

The non-PUCCH serving cell (non-PUCCH secondary cell) may have only the downlink component carrier. The non-PUCCH serving cell (non-PUCCH secondary cell) may have the downlink component carrier and the uplink component carrier.

The terminal device 1 may perform transmission on the PUCCH in the PUCCH serving cell. In other words, the terminal device 1 may perform transmission on the PUCCH in the primary cell. Moreover, the terminal device 1 may perform transmission on the PUCCH in the PUCCH secondary cell. In other words, the terminal device 1 does not perform transmission on the PUCCH in the non-special secondary cell.

Here, the PUCCH secondary cell may be defined as a serving cell that is neither a primary cell nor a secondary cell.

In other words, the PUCCH secondary cell may be used for transmission on the PUCCH. Here, the PUCCH secondary cell may not be deactivated. The PUCCH secondary cell may be activated and/or deactivated as described below.

The cross-carrier scheduling may not apply to the PUCCH secondary cell. In other words, the PUCCH secondary cell may be always scheduled via a PDCCH in the PUCCH secondary cell. Here, the cross-carrier scheduling may apply to the PUCCH secondary cell. In other words, the PUCCH secondary cell may be scheduled via the PDCCH of one other serving cell.

For example, in a case that a PDCCH (or PDCCH monitoring) is configured in the PUCCH secondary cell, the cross-carrier scheduling may not apply to the PUCCH secondary cell. In other words, in this case, the PUCCH secondary cell may be always scheduled via its PDCCH. In a case that no PDCCH (or PDCCH monitoring) is configured in the PUCCH secondary cell, the cross-carrier scheduling applies, and the PUCCH secondary cell may always be scheduled via the PDCCH in another serving cell.

Here, linking may be defined between the uplink (e.g., uplink component carrier) and the downlink (e.g., the downlink component carrier). In other words, in accordance with the linking between the uplink and the downlink, the serving cell for downlink assignment (serving cell in which transmission (downlink transmission) on the PDSCH scheduled via the downlink assignment is performed) may be identified. In accordance with the linking between the uplink and the downlink, the serving cell for uplink grant (serving cell in which transmission on the PUSCH scheduled via uplink grant (uplink transmission) is performed) may be identified. Here, there is no carrier indicator field in the downlink assignment or the uplink.

In other words, the downlink assignment received in the primary cell may correspond to downlink transmission in the primary cell. Moreover, the uplink grant received in the primary cell may correspond to uplink transmission in the primary cell. The downlink assignment received in the PUCCH secondary cell may correspond to downlink transmission in the PUCCH secondary cell. Moreover, the uplink grant received in the PUCCH secondary cell may correspond to uplink transmission in the PUCCH secondary cell.

The downlink assignment received in a certain secondary cell (PUCCH secondary cell and/or non-PUCCH secondary cell) may correspond to the downlink transmission in the certain secondary cell. The uplink grant received in a certain secondary cell (PUCCH secondary cell and/or non-PUCCH secondary cell) may correspond to the uplink transmission in the certain secondary cell.

Here, the base station device 3 may configure one or multiple serving cells through higher layer signaling. For example, one or multiple secondary cells may be configured to form a set of multiple serving cells with a primary cell.

Here, the serving cells configured by the base station device 3 may include a PUCCH secondary cell.

In other words, the PUCCH secondary cell may be configured by the base station device 3. For example, the base station device 3 may transmit the higher layer signaling that includes information (index) used to configure the PUCCH secondary cell.

The base station device 3 may activate or deactivate one or multiple serving cells through the higher layer signaling (e.g., the MAC control element). For example, the activation or deactivation mechanism may be based on a combination of the MAC control element and a deactivation timer.

Here, secondary cells activated or deactivated by the base station device 3 may include a PUCCH secondary cell. To be more specific, the base station device 3 may solely activate or deactivate multiple secondary cells including the PUCCH secondary cell through a single activation/deactivation command. In other words, the base station device 3 may transmit the single command to be used to activate or deactivate the secondary cells through the MAC control element.

As a value of the deactivation timer, a common value may be configured for each terminal device 1 by the higher layers (e.g., the RRC layer). The deactivation timer (the value of the timer) may be maintained for (apply to) each of the secondary cells. Here, the deactivation timer (the value of the timer) may be maintained for each of the non-PUCCH secondary cells only. In other words, the terminal device 1 may maintain (apply) the deactivation timer for (to) each of the non-PUCCH secondary cells only, without applying the deactivation timer to the PUCCH secondary cells.

Alternatively, a deactivation timer for PUCCH secondary cells and a deactivation timer for non-PUCCH secondary cells may be configured separately. For example, the base station device 3 may transmit the higher layer signaling including the deactivation timer for the PUCCH secondary cells and information on the configuration of the deactivation timer. Moreover, the base station device 3 may transmit the higher layer signaling including the deactivation timer for the non-PUCCH secondary cells and information on the configuration of the deactivation timer.

A configuration of a slot according to the present embodiment will be described below.

Figure 2:
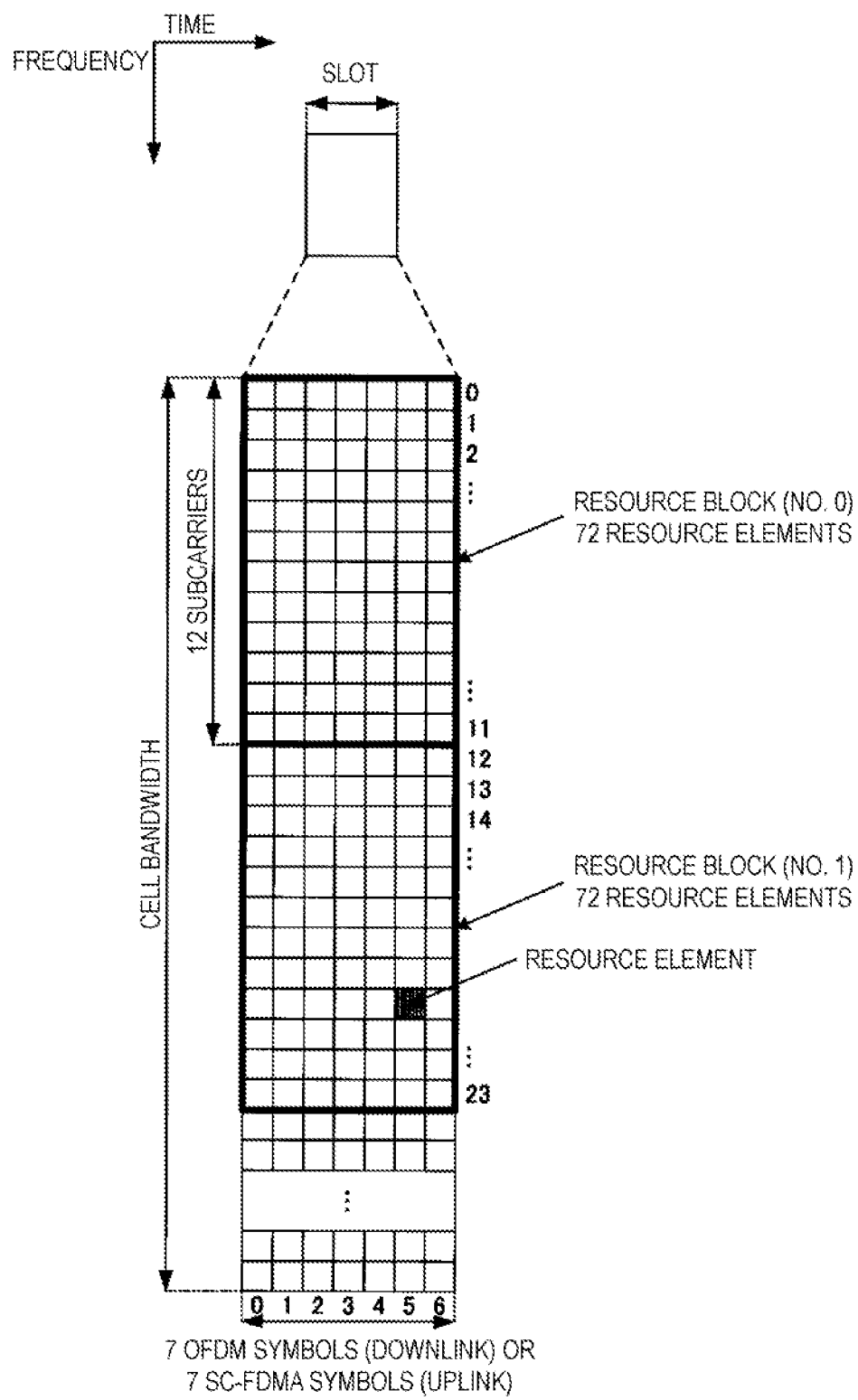
FIG. 2 is a diagram illustrating a configuration of a slot according to the present embodiment.

FIG. 2 is a diagram illustrating the configuration of the slot according to the present embodiment. In FIG. 2, the horizontal axis represents a time axis, and the vertical axis represents a frequency axis. Here, a normal cyclic prefix (CP) may apply to an OFDM symbol. Alternatively, an extended cyclic prefix (CP) may apply to the OFDM symbol. The physical signal or the physical channel transmitted in each of the slots is expressed by a resource grid.

In the downlink, the resource grid may be defined by multiple subcarriers and multiple OFDM symbols. In the uplink, the resource grid may be defined by multiple subcarriers and multiple SC-FDMA symbols. The number of subcarriers constituting one slot may depend on a cell bandwidth. The number of OFDM symbols or SC-FDMA symbols constituting one slot may be seven. Each element within the resource grid is referred to as a resource element. The resource element may be identified by a subcarrier number, and an OFDM symbol or SC-FDMA symbol number.

A resource block may be used to express mapping of a certain physical channel (the PDSCH, the PUSCH, or the like) to the resource elements. The resource block may be defined by a virtual resource block and a physical resource block. A certain physical channel may be first mapped to the virtual resource block. Thereafter, the virtual resource block may be mapped to the physical resource block. One physical resource block may be defined by seven consecutive OFDM symbols or SC-FDMA symbols in a time domain and by 12 consecutive subcarriers in a frequency domain. Therefore, one physical resource block may be constituted of (7×12) resource elements. Furthermore, one physical resource block may correspond to one slot in the time domain and correspond to 180 kHz in the frequency domain. The physical resource blocks may be numbered from 0 in the frequency domain.

FIGS. 3A to 3C are diagrams illustrating cell groups according to the present embodiment. FIG. 3A to 3C respectively illustrate three examples (Example (a), Example (b), and Example (c)) as examples of a configuration of the PUCCH cell group (constitution, definition). Here, in the present embodiment, a group of one or multiple serving cells is referred to as a PUCCH cell group. The PUCCH cell group may be a group associated with transmission on the PUCCH (transmission of uplink control information on the PUCCH). Here, a certain serving cell belongs to any one of the PUCCH cell groups. Here, it goes without saying that the PUCCH cell group may be configured differently from the examples illustrated in FIGS. 3A to 3C.

Here, the PUCCH cell group may be configured by the base station device 3. For example, the base station device 3 may transmit the higher layer signaling that includes information (or index, cell group index) used to configure the PUCCH cell group.

Here, the present embodiment can be, of course, applied to a group of one or multiple serving cells different from the PUCCH cell group described above. For example, the base station device 3 may configure a group of one or multiple serving cells to correspond to the serving cells indicated using a carrier indicator field (CIF). In other words, the base station device 3 may configure one or multiple serving cells in association with the uplink transmission. The base station device 3 may configure a group of one or multiple serving cells in association with the downlink transmission.

Hereinafter, the group of one or multiple serving cells configured by the base station device 3 is also referred to as a cell group. Specifically, the PUCCH cell group is included in the cell group. Here, the base station device 3 and/or the terminal device 1 may perform the operations described in the present embodiment in each cell group. To be more specific, the base station device 3 and the terminal device 1 may perform the operations described in the present embodiment in one PUCCH cell group.

Here, the base station device 3 and/or the terminal device 1 may support the carrier aggregation of up to 32 downlink component carriers (downlink cells), for example. In other words, the base station device 3 and the terminal device 1 can simultaneously perform transmission and/or reception of multiple physical channels in up to 32 serving cells. Here, the number of uplink component carriers may be less than the number of downlink component carriers.

The base station device 3 and/or the terminal device 1 may support the carrier aggregation of up to 5 downlink component carriers (downlink cells), for example. In other words, the base station device 3 and the terminal device 1 can simultaneously perform transmission and/or reception of multiple physical channels in up to 5 serving cells. Here, the number of uplink component carriers may be less than the number of downlink component carriers.

FIG. 3A illustrates a configuration where a first cell group and a second cell group are configured as the cell groups (PUCCH cell groups, here). For example, in FIG. 3A, the base station device 3 may transmit a downlink signal in the first cell group, and the terminal device 3 may transmit an uplink signal in the first cell group (may transmit the uplink control information on the PUCCH in the first cell group). For example, in a case that 20 serving cells (downlink component carriers or downlink cells) are configured or activated in the first cell group, the base station device 3 and the terminal device 1 may transmit and receive the uplink control information for 20 downlink component carriers to and from each other.

To be more specific, the terminal device 1 may transmit the HARQ-ACK corresponding to 20 downlink component carriers (HARQ-ACK for transmission on the PDSCH and HARQ-ACK for transport blocks). The terminal device 1 may transmit the CSI corresponding to 20 downlink component carriers. Moreover, the terminal device 1 may transmit the SR for each cell group. Similarly, the base station device 3 and the terminal device 1 may transmit and receive the uplink control information to and from each other in the second cell group.

Similarly, the base station device 3 and the terminal device 1 may configure a cell group as illustrated in FIG. 3B, and transmit and receive the uplink control information to and from each other. The base station device 3 and the terminal device 1 may configure a cell group as illustrated in FIG. 3C, and transmit and receive the uplink control information to and from each other.

Here, one cell group (e.g., PUCCH cell group) may include at least one serving cell (e.g., PUCCH serving cell). One cell group (e.g., PUCCH cell group) may include only one serving cell (e.g., PUCCH serving cell). For example, one PUCCH cell group may include one PUCCH serving cell, and one or multiple non-PUCCH serving cells.

Here, a cell group including the primary cell is referred to as a primary cell group. A cell group not including the primary cell is referred to as a secondary cell group. A PUCCH cell group including the primary cell is referred to as a primary PUCCH cell group. A PUCCH cell group not including the primary cell is referred to as a secondary PUCCH cell group.

In other words, a secondary PUCCH cell group may include a PUCCH secondary cell. For example, the index for the primary PUCCH cell group may always be defined as 0. The index for the secondary PUCCH cell group may be configured by the base station device 3 (or a network device).

The base station device 3 may transmit information used to indicate the PUCCH secondary cell in a state that the information is included in the higher layer signaling and/or the PDCCH (the downlink control information transmitted on the PDCCH). The terminal device 1 may determine the PUCCH secondary cell in accordance with the information used to indicate the PUCCH secondary cell. Here, a cell index of the PUCCH secondary cell may be defined by a specification or the like in advance.

As described above, the PUCCH in the PUCCH serving cell may be used to transmit the uplink control information (HARQ-ACK, CSI (e.g., periodic CSI) and/or SR) with respect to a serving cell (PUCCH serving cell, non-PUCCH serving cell) included in the PUCCH cell group to which the PUCCH serving cell belongs.

In other words, the uplink control information (HARQ-ACK, CSI (e.g., periodic CSI), and/or SR) with respect to the serving cell (PUCCH serving cell or non-PUCCH serving cell) included in the PUCCH cell group is transmitted on the PUCCH in the PUCCH serving cell included in the PUCCH cell group.

Here, the present embodiment may apply only to transmission of HARQ-ACK. Alternatively, the present embodiment may apply only to transmission of CSI (e.g., periodic CSI). Alternatively, the present embodiment may apply only to transmission of SR. Alternatively, the present embodiment may apply to transmission of HARQ-ACK, transmission of CSI (e.g., periodic CSI), and/or transmission of SR.

In other words, a cell group (or PUCCH cell group) for transmission of HARQ-ACK may be configured. A cell group (or PUCCH cell group) for transmission of CSI (e.g., periodic CSI) may be configured. A cell group (or PUCCH cell group) for transmission of SR may be configured.

For example, the cell group for transmission of HARQ-ACK, the cell group for transmission of CSI (e.g., periodic CSI), and/or the cell group for transmission of SR may be configured separately. Alternatively, a common cell group may be configured as the cell group for transmission of HARQ-ACK, the cell group for transmission of CSI (e.g., periodic CSI), and/or the cell group for transmission of SR.

Here, the number of cell groups for transmission of HARQ-ACK may be one or two. The number of cell groups for transmission of CSI may be one or two. The number of cell groups for transmission of SR may be one or two. The cell group for transmission of CSI (e.g., periodic CSI) and/or the cell group for transmission of SR does not need to be configured (defined).

Here, multiple formats may be defined (supported) for the PUCCH. Each format supported for the PUCCH (the format that the PUCCH supports) is also referred to as a PUCCH format. For example, the use of the following PUCCH formats allows combinations of pieces of uplink control information on the PUCCH (transmission of combinations of pieces of uplink control information) to be supported.

Format 1
Format 1a
Format 1b
Format 2
Format 2a
Format 2b
Format 3
Format 4
(Format 4a)
(Format 4b)

PUCCH format 1 may be defined for a positive SR. For example, the positive SR may be used to indicate that an UL-SCH resource is requested. Here, a negative SR may be used to indicate that an UL-SCH resource is not requested. PUCCH format 1 is also referred to as a first PUCCH format below.

PUCCH format 1a may be defined for 1-bit HARQ-ACK or 1-bit HARQ-ACK with positive SR. PUCCH format 1b may be defined for 2-bit HARQ-ACK or 2-bit HARQ-ACK with positive SR. PUCCH format 1b may be defined for transmission of up to 4-bit HARQ-ACK with channel selection. PUCCH format 1a and/or PUCCH format 1b is also referred to as a second PUCCH format below.

PUCCH format 2 may be defined for a CSI report when not multiplexed with HARQ-ACK. PUCCH format 2a may be defined for a CSI report multiplexed with 1-bit HARQ-ACK. PUCCH format 2b may be defined for a CSI report multiplexed with 2-bit HARQ-ACK. Here, PUCCH format 2 may be defined for a CSI report multiplexed with HARQ-ACK for extended cyclic prefix. PUCCH format 2, PUCCH format 2a, and/or PUCCH format 2b is also referred to as a third PUCCH format below.

PUCCH format 3 may be defined for up to 10-bit HARQ-ACK. For example, PUCCH format 3 may be defined for up to 10-bit HARQ-ACK for FDD or FDD-TDD primary cell frame structure type 1.

PUCCH format 3 may be defined for up to 20-bit HARQ-ACK. For example, PUCCH format 3 may be defined for up to 20-bit HARQ-ACK for TDD. PUCCH format 3 may be defined for up to 21-bit HARQ-ACK. For example, PUCCH format 3 may be defined for up to 21-bit HARQ-ACK for FDD-TDD primary cell frame structure type 2.

Alternatively, PUCCH format 3 may be defined for up to 11-bit corresponding to up to 10-bit HARQ-ACK and 1-bit positive/negative SR. For example, PUCCH format 3 may be defined for up to 11-bit corresponding to up to 10-bit HARQ-ACK and 1-bit positive/negative SR for FDD or FDD-TDD.

Alternatively, PUCCH format 3 may be defined for up to 21-bit corresponding to up to 20-bit HARQ-ACK and 1-bit positive/negative SR. For example, PUCCH format 3 may be defined for up to 21-bit corresponding to up to 20-bit HARQ-ACK and 1-bit positive/negative SR for TDD. Alternatively, PUCCH format 3 may be defined for up to 22-bit corresponding to up to 21-bit HARQ-ACK and 1-bit positive/negative SR (up to 22-bit corresponding to up to 20-bit HARQ-ACK and 1-bit positive/negative SR). For example, PUCCH format 3 may be defined for up to up to 22-bit corresponding to up to 21-bit HARQ-ACK and 1-bit positive/negative SR for FDD-TDD primary cell frame structure type 2.

Here, in a case that the uplink control information (HARQ-ACK, SR, and/or CSI) is transmitted using PUCCH format 3, a first coding method (e.g., Reed-Muller code (Reed-Muller coding) or a (32, O) block code ((32, O) block coding)) may be used. Here, for example, basis sequences for the (32, O) block code may be given by a specification or the like in advance.

PUCCH format 3 may be defined for HARQ-ACK and a CSI report for one serving cell. Alternatively, PUCCH format 3 may be defined for HARQ-ACK and one CSI report for one serving cell. Alternatively, PUCCH format 3 may be defined for multiple CSI reports. Alternatively, PUCCH format 3 may be defined for HARQ-ACK and multiple CSI reports. Alternatively, PUCCH format 3 may be defined for HARQ-ACK, 1-bit positive/negative SR (if any), and a CSI report for one serving cell. Alternatively, PUCCH format 3 may be defined for HARQ-ACK, 1-bit positive/negative SR (if any), and one CSI report. Alternatively, PUCCH format 3 may be defined for HARQ-ACK, 1-bit positive/negative SR (if any), and multiple CSI reports. PUCCH format 3 is also referred to as a fourth PUCCH format below.

PUCCH format 4 may be defined for HARQ-ACK corresponding to up to 32 serving cells (downlink component carriers or downlink cells). Alternatively, PUCCH format 4 may be defined for HARQ-ACK and one or multiple CSI reports. Alternatively, PUCCH format 4 may be defined for HARQ-ACK and SR. Alternatively, PUCCH format 4 may be defined for HARQ-ACK, SR, and one or multiple CSI reports. Here, the one or multiple CSI reports may be the CSI report(s) for one serving cell. Alternatively, the one or multiple CSI reports may be the CSI report(s) for multiple serving cells. Alternatively, the one or multiple CSI reports may include one CSI report for one CSI process for one serving cell. Alternatively, the one or multiple CSI reports may be one CSI report for one CSI process. Alternatively, the one or multiple CSI reports may be multiple CSI reports for multiple CSI processes. Alternatively, the one or multiple CSI reports may include one CSI report for one subframe set for one serving cell. Alternatively, the one or multiple CSI reports may be multiple reports for multiple subframe sets. The SR may be positive SR and/or negative SR. However, PUCCH format 4 may not be common to the case used for HARQ-ACK, the case used for one or multiple CSI reports for multiple serving cell or multiple CSI processes, and the case used to simultaneously transmit HARQ-ACK and one or multiple CSI reports, and the different PUCCH format may be used in any of those cases. (For example, the respective formats may be defined as PUCCH format 4, PUCCH format 4a, and PUCCH format 4b.) PUCCH format 4 (which may include PUCCH format 4a and PUCCH format 4b) is also referred to as a fifth PUCCH format below.

Here, in a case that the uplink control information is transmitted with the fifth PUCCH format, a second coding method (e.g., a Tail biting convolutional encoder (Tail biting convolutional coding) or a Turbo encoder (Turbo coding) may be used.

In other words, the number of bits per subframe to be transmitted (transmittable) with the fifth PUCCH format may be larger than the number of bits per subframe to be transmitted (transmittable) with the fourth PUCCH format. To be more specific, an information amount per subframe to be transmitted (transmittable) with the fifth PUCCH format may be larger than an information amount per subframe to be transmitted (transmittable) with the fourth PUCCH format. As described above, the coding method used may be different between the transmission of the uplink control information with the fourth PUCCH format and the transmission of the uplink control information with the fifth PUCCH format.

Here, in the case that the HARQ-ACK is transmitted with the third PUCCH format, the terminal device 1 may determine the number of HARQ-ACK bits, at least based on the number of configured serving cells and the downlink transmission mode configured for each serving cell (each of the configured serving cells). In the case that the HARQ-ACK is transmitted with the fifth PUCCH format, the terminal device 1 may determine the number of HARQ-ACK bits, at least based on the number of configured or activated serving cells and the downlink transmission mode configured for each serving cell (each of the configured or activated serving cells).

In the case that the HARQ-ACK is transmitted with the fourth PUCCH format, the terminal device 1 may determine the number of HARQ-ACK bits, at least based on the number of configured serving cells and the downlink transmission mode configured for each serving cell (each of the configured serving cells). In the case that the HARQ-ACK is transmitted with the fifth PUCCH format, the terminal device 1 may determine the number of HARQ-ACK bits, at least based on the number of configured or activated serving cells and the downlink transmission mode configured for each serving cell (each of the configured or activated serving cells).

Here, for example, the terminal device 1 may use 2-bit HARQ-ACK bit for a serving cell configured in a downlink transmission mode that supports up to two transport blocks, and use 1-bit HARQ-ACK bit otherwise (e.g., for a serving cell configured in a downlink transmission mode that supports one transport block). Here, for example, the downlink transmission mode that supports up to two transport blocks may include transmission mode 3, transmission mode 4, transmission mode 8, transmission mode 9, and/or transmission mode 10. The downlink transmission mode that supports one transport block may include transmission mode 1, transmission mode 2, transmission mode 5, transmission mode 6, and/or transmission mode 7.

As described above, the base station device 3 may use the higher layer signaling (e.g., RRC signaling) to configure the serving cell for the terminal device 1. The base station device 3 may use the higher layer signaling to configure the downlink transmission mode (e.g., RRC signaling) for the terminal device 1. For example, the base station device 3 may configure the downlink transmission mode associated with transmission on the PDSCH for the terminal device 1. In other words, with respect to the transmission of HARQ-ACK with the fourth PUCCH format and/or the fifth PUCCH format, the number of HARQ-ACK bits may be determined in the RRC layer (based on the information in the RRC layer).

Here, the base station device 3 may use the higher layer signaling (information transmitted through the higher layer signaling) and/or the PDCCH (downlink control information transmitted on the PDCCH) to make a configuration in order for the terminal device 1 to use any one of PUCCH format 1b with channel selection, PUCCH format 3, or PUCCH format 4 (or PUCCH format 4a and/or PUCCH format 4b) for the transmission of the uplink control information (e.g. the transmission of HARQ-ACK). In other words, the base station device 3 may make a configuration in order for the terminal device 1 to use PUCCH format 1b with channel selection for the transmission of the uplink control information. The base station device 3 may make a configuration in order for the terminal device 1 to use PUCCH format 3 for the transmission of the uplink control information. Alternatively, the base station device 3 may make a configuration in order for the terminal device 1 to use PUCCH format 4 (or PUCCH format 4a and/or PUCCH format 4b) for the transmission of the uplink control information.

For example, the base station device 3 may make a configuration in order for the terminal device 1 to use any one of PUCCH format 1b with channel selection, PUCCH format 3, or PUCCH format 4 (or PUCCH format 4a and/or PUCCH format 4b), for each cell group. In other words, the base station device 3 may make a configuration in order for the terminal device 1 to use any one of PUCCH format 1b with channel selection, PUCCH format 3, or PUCCH format 4 (or PUCCH format 4a and/or PUCCH format 4b) independently for each cell group. In other words, the terminal device 1 may be configured by the base station device 3 to use any one of PUCCH format 1b with channel selection, PUCCH format 3, or PUCCH format 4 (or PUCCH format 4a and/or PUCCH format 4b).

In a case that more than one serving cell (more than one and up to five serving cells) with frame structure type 1 and/or frame structure type 2 is configured for the terminal device 1, the terminal device 1 may be configured by the base station device 3 to use any one of PUCCH format 1b with channel selection, PUCCH format 3, or PUCCH format 4 (or PUCCH format 4a and/or PUCCH format 4b). In a case that more than five serving cells with frame structure type 1 and/or frame structure type 2 are configured for the terminal device 1, the terminal device 1 may be configured by the base station device 3 to use any one of PUCCH format 1b with channel selection, PUCCH format 3, or PUCCH format 4 (or PUCCH format 4a and/or PUCCH format 4b).

The base station device 3 may indicate (configure or allocate) a PUCCH resource to the terminal device 1. Here, the PUCCH resource may include a first PUCCH resource (also referred to as n(1)PUCCH), a second PUCCH resource (also referred to as n(2)PUCCH), a third PUCCH resource (also referred to as n(3)PUCCH), and a fourth PUCCH resource (also referred to as n(4)PUCCH).

For example, the base station device 3 may transmit the higher layer signaling including first information to be used to configure the first PUCCH resource. For example, the SR may be transmitted with the first PUCCH resource. The base station device 3 may transmit the higher layer signaling including second information to be used to indicate periodicity and/or offset for transmission of SR. The terminal device 1 may transmit the SR in accordance with a configuration made by the base station device 3. To be more specific, the terminal device 1 may transmit the SR with the first PUCCH resource and/or the first PUCCH format.

The base station device 3 may indicate the first PUCCH resource through the higher layer signaling and the PDCCH. For example, the base station device 3 may transmit the higher layer signaling including third information to be used to configure the first PUCCH resource. For example, HARQ-ACK corresponding to the second PUCCH format may be transmitted with the first PUCCH resource. The terminal device 1 may determine the first PUCCH resource based on the Control Channel Element (CCE) used for the transmission of the PDCCH (e.g., the lowest index of the CCE) and the third information. The terminal device 1 may use the first PUCCH resource for the transmission of HARQ-ACK corresponding to the second PUCCH format. To be more specific, the terminal device 1 may transmit the HARQ-ACK with the first PUCCH resource and/or the second PUCCH format.

The base station device 3 may transmit the higher layer signaling including fourth information to be used to configure the second PUCCH resource. For example, the CSI (e.g., periodic CSI) may be transmitted with the second PUCCH resource. Here, the second PUCCH resource may be configured for each of the serving cells. In other words, the CSI may be reported for each serving cell. The base station device 3 may transmit the higher layer signaling including fifth information to be used to indicate periodicity and/or offset for a periodic CSI report. Here, the fifth information may be information for each CSI process, for each subframe set and/or for each serving cell. The terminal device 1 may periodically report the CSI in accordance with a configuration made by the base station device 3. To be more specific, the terminal device 1 may report the periodic CSI with the second PUCCH resource and/or the third PUCCH format.

The base station device 3 may indicate the third PUCCH resource through the higher layer signaling and the PDCCH (or downlink control information transmitted on the PDCCH). For example, the CSI, SR, and/or HARQ-ACK corresponding to the fourth PUCCH format may be transmitted with the third PUCCH resource. For example, the base station device 3 may transmit through the higher layer signaling sixth information for configuring multiple values associated with the third PUCCH resource, and further, may indicate the third resource by indicating one value among the multiple values based on a value (also referred to as $1^{st}$ ACK Resource Indicator: $1^{st}$ ARI) set in a field of the downlink control information transmitted on the PDCCH.

For example, the base station device 3 may transmit through the higher layer signaling the sixth information for configuring four values corresponding to four third PUCCH resources. Further, based on the values (e.g., "00", "01", "10", or "11" set in a field of 2-bit information) set in the field of the downlink control information transmitted on the PDCCH, by indicating one value among the four values, the base station device 3 may indicate a single third resource corresponding to the one value. In other words, the terminal device 1 may determine, based on one value corresponding to the value set in the field of the downlink control information, a single third PUCCH resource corresponding to the one value from four values corresponding to four third PUCCH resources.

For example, the base station device 3 may indicate the third PUCCH resource based on a value set in a transmit power command field (hereinafter, also referred to as a TPC command field) for the PUCCH included in the downlink assignment for the secondary cell transmitted on the PDCCH. In other words, one value corresponding to a single third PUCCH resource may be indicated based on the value set in the TPC command field included in the downlink assignment used to indicate transmission on the PDSCH in the secondary cell.

Here, the TPC command field included in the downlink assignment for the primary cell (i.e., downlink assignment used to indicate transmission on the PDSCH in the primary cell) may be used for a transmit power command for transmission on the PUCCH. The TPC command field included in the downlink assignment for the PUCCH secondary cell (i.e., downlink assignment used to indicate transmission on the PDSCH in the PUCCH secondary cell can be used) may be used for a transmit power command for transmission on the PUCCH.

The base station device 3 may indicate the fourth PUCCH resource through the higher layer signaling and the PDCCH (or downlink control information transmitted on the PDCCH). For example, the CSI, SR, and/or HARQ-ACK corresponding to the fifth PUCCH format may be transmitted with the fourth PUCCH resource.

For example, the terminal device 1 may report the CSI in a certain subframe with the second PUCCH resource and/or the third PUCCH format. In other words, in the case that the CSI is reported by the terminal device 1 with the third PUCCH format, the second PUCCH resource is used.

Alternatively, the terminal device 1 may report the CSI in a certain subframe with the third PUCCH resource and/or the fourth PUCCH format. In other words, in the case that the CSI is transmitted by the terminal device 1 with the fourth PUCCH format, the third PUCCH resource is used.

The terminal device 1 may transmits the CSI in a certain subframe with the fourth PUCCH resource and/or the fifth PUCCH format. In other words, in the case that the CSI is transmitted by the terminal device 1 with the fifth PUCCH format, the fourth PUCCH resource is used.

Here, for example, the terminal device 1 may use different PUCCH formats and/or different PUCCH resources for the CSI reports corresponding to respective serving cells or some serving cells. Alternatively, the terminal device 1 may use different PUCCH formats and/or different PUCCH resources for the CSI reports corresponding to respective CSI processes or some CSI processes. Alternatively, the terminal device 1 may use different PUCCH formats and/or different PUCCH resources for the CSI reports corresponding to respective subframe sets or some subframe sets.

Here, different PUCCH resources may be used for multiple CSI reports with the same PUCCH format. For example, the second PUCCH resource used for a first CSI report with the third PUCCH format and the second PUCCH resource used for a second CSI report with the third PUCCH format may be different resources from each other. For example, the second PUCCH resource used for the second CSI report may be a PUCCH resource indicated by (configured with) a resource index different from a resource index for the second PUCCH resource used for the first CSI report. Alternatively, the second PUCCH resource used for the second CSI report may be a PUCCH resource indicated by (configured with) an orthogonal sequence index different from an orthogonal sequence index for the second PUCCH resource used for the first CSI report. Alternatively, the second PUCCH resource used for the second CSI report may be a PUCCH resource indicated by (configured with) a value of a cyclic shift different from a cyclic shift for the second PUCCH resource used for the first CSI report.

Here, the cell index includes a serving cell index (also referred to as ServingCellIndex) relating to identity used to identify the serving cell.

A serving cell index value "0" may apply to the primary cell. A serving cell index value applying to the secondary cell may be an assigned secondary cell index value. The secondary cell index (ScellIndex) and/or the serving cell index (ServingCellIndex) is also referred to as a cell index below.

Here, the base station device 3 may configure the cell index (cell index value) for the terminal device 1. For example, the base station device 3 may transmit the higher layer signaling that includes the cell index. The terminal device 1 may identify the cell index of the serving cell based on the cell index configured by the base station device 3. In other words, the cell index may be an index in the higher layer (also referred to as an index in the RRC layer or an RRC index).

Hereinafter, operations in the terminal device 1 are basically described, but, of course, the base station device 3 performs the operations corresponding to the terminal device 1. The operations described in the present embodiment may be performed for each cell group. To be more specific, the base station device 3 and/or the terminal device 1 may perform the operations described in the present embodiment in one cell group.

For example, the operations described in the present embodiment may be applicable to the case that the PUCCH format 3 is configured for transmission of the uplink control information (e.g., transmission of the CSI report). The operations described in the present embodiment may be applicable to the case that the PUCCH format 4 is configured for transmission of the uplink control information (e.g., transmission of the CSI report).

The operations described in the present embodiment may be applicable to the case that one serving cell is configured. The operations described in the present embodiment may be applicable to the case that more than one serving cell is configured. The operations described in the present embodiment may be applicable to the case that more than five serving cells are configured. Here, the case that more than one serving is configured may be the case that more than one and up to five serving cells are configured.

Hereinafter, the periodic CSI reporting using the PUCCH according to the present embodiment will be described. However, multiple CSI subframe sets may be configured in the uplink performing the CSI reporting.

The base station device 3 makes a configuration in order for the terminal device 1 to report the periodic CSI on the PUCCH in any of reporting modes. The base station device 3 configures a reporting mode and a PUCCH resource used for periodic CSI reporting for each serving cell. The base station device 3 transmits information relating to the periodic CSI reporting for each serving cell to the terminal device 1.

(A) For example, the terminal device 1 configured with reporting mode 1-0 does not transmit a PMI. The terminal device 1 configured with reporting mode 1-0 does not transmit a subband CQI, but transmits a wideband CQI.

(B) For example, the terminal device 1 configured with reporting mode 1-1 transmits a PMI. The terminal device 1 configured with reporting mode 1-1 does not transmit a subband CQI, but transmits a wideband CQI.

(C) For example, the terminal device 1 configured with reporting mode 2-0 does not transmit a PMI. The terminal device 1 configured with reporting mode 2-0 transmits a subband CQI and a wideband CQI.

(D) For example, the terminal device 1 configured with reporting mode 2-1 transmits a PMI. The terminal device 1 configured with reporting mode 2-1 transmits a subband CQI and a wideband CQI.

The wideband CQI is calculated based on CRS and/or CSI-RS transmitted on all physical resource blocks in a certain subframe of a certain serving cell. The subband CQI is calculated based on CRS and/or CSI-RS transmitted on the physical resource blocks constituting a particular part of the bandwidth in a certain subframe of a certain serving cell.

Each of the CSI reporting modes supports multiple reporting types.

(A) For example, reporting type 1 supports subband CQI feedback.

(B) For example, reporting type 1a supports subband CQI and PMI feedback.

(C) For example, reporting type 2, reporting type 2a, and reporting type 2b support wideband CQI and PMI feedback.

(D) For example, reporting type 3 supports RI feedback.

(E) For example, reporting type 4 supports wideband CQI feedback.

(F) For example, reporting type 5 supports RI and wideband PMI feedback.

(G) For example, reporting type 6 supports RI and PTI feedback.

In a case that a certain serving cell is configured with reporting mode 1-0, the terminal device 1 reports the CSI of reporting type 3 and reporting type 4 corresponding to the serving cell to the base station device 3. In a case that a certain serving cell is configured with reporting mode 1-1, the terminal device 1 reports the CSI of reporting types 2/2b/2c, reporting type 3 and reporting type 5 corresponding to the serving cell to the base station device 3.

In a case that a certain serving cell is configured with reporting mode 2-0, the terminal device 1 reports the CSI of reporting type 1, reporting type 3 and reporting type 4 corresponding to the serving cell to the base station device 3. In a case that a certain serving cell is configured with reporting mode 2-1, the terminal device 1 reports the CSI of reporting types 1/1a, reporting types 2/2a/2b, reporting type 3 and reporting type 6 corresponding to the serving cell to the base station device 3.

In a case that the terminal device 1 is configured in a transmission mode (e.g., transmission mode 10) capable of configuring multiple CSI processes in a certain serving cell to report RI and/or PMI in a certain CSI process, the terminal device 1 may be configured with a RI-reference CSI process for the CSI process. In a case that the terminal device 1 is configured with a RI-reference CSI process for a certain CSI process, the RI reported for the CSI process is the same as the RI included in the most recent report of the channel state information including the RI for the configured RI-reference CSI process. However, the RI reported for the RI-reference CSI process is not based on any other configured CSI process. The terminal device 1 does not expect to receive an aperiodic CSI report request for triggering a CSI report including CSI associated with a certain CSI process and not including CSI associated with the configured RI-reference CSI process in a certain subframe.

Hereinafter, reporting of the RI (also referred to as a periodic RI) in the periodic CSI report according to the present embodiment will be described.

The terminal device 1 determines the RI from the number of available transmission layers in spatial multiplexing. In a case of transmit diversity, the RI is equal to one. The RI corresponds to transmission on the physical downlink shared channel (PDSCH) transmission, and corresponds to the number of layers determined by the terminal device 1.

The terminal device 1 may be configured with one or multiple CSI processes by the higher layer. Each CSI process is configured with a CSI process index by the higher layer. For each CSI process, whether PMI and/or RI report is performed is configured by the higher layer signaling. The terminal device 1 determines one RI from the supported set of RI values for each RI reporting interval and reports the number of transmission layers in each RI report.

The terminal device 1 may be configured with one or multiple CSI subframe sets (e.g., CSI subframe set 0 and CSI subframe set 1) by the higher layer. For the terminal device 1 configured with multiple subframe sets, a configuration of CQI or RI (e.g., a period for a report timing or offset can be used) may be made independently for each subframe set.

Hereinafter, RI and CQI reporting procedure in each reporting mode will be described. The RI and the CQI will be described below, but other CSI (e.g., PMI, PTI, or the like) may be simultaneously reported in any procedure.

In a case of reporting mode 1-0, the RI and the CQI are calculated as below.

(RI in reporting mode 1-0) In the subframe where RI is reported, the terminal device 1 in the case of transmission mode 3 determines the RI assuming transmission on all frequency bands (sometimes referred to as set S subbands) possibly configured as a subband and reports the RI with reporting type 3.

(CQI in reporting mode 1-0) In the subframe where CQI is reported, the terminal device 1 reports the CQI with reporting type 4 constituted of a single wideband CQI calculated assuming transmission on all frequency bands possibly configured as a subband. In this case, in the case of transmission mode 3, the CQI is calculated based on the last reported periodic RI. In a case of other transmission modes, the CQI is calculated conditioned on rank 1.

In a case of reporting mode 1-1, the RI and the CQI are calculated as below.

(RI in reporting mode 1-1) In the subframe where RI is reported, in a case that the terminal device 1 is configured in transmission mode 10 with a RI-reference CSI process for a certain CSI process, the terminal device 1, regardless of the configuration of the subframe set, sets a RI for the CSI process to the same value of the RI in the most recent CSI report including a RI for the configured RI-reference CSI process. In other cases, the terminal device 1 determines the RI assuming transmission on all frequency bands possibly configured as a subband. The terminal device 1 reports the determined RI with reporting type 3 (in a case without PMI) or reporting type 5 (in a case with PMI).

(CQI in reporting mode 1-1) In the subframe where CQI is reported, the terminal device 1 in the case of a prescribed transmission mode (e.g., transmission mode 4, 8, 9, or 10) reports the CQI as below. In a case that the terminal device 1 is configured in transmission mode 10 with a RI-reference CSI process for a certain CSI process, and the most recent reporting type 3 report for the CSI process is dropped, and the most recent reporting type 3 report is reported in the RI-reference CSI process for the CSI process, the CQI for the CSI process is calculated based on the periodic RI reported in the RI-reference CSI process. In a case that the terminal device 1 is configured in transmission mode 10 with no RI-reference CSI process for a certain CSI process, the CQI for the CSI process is calculated based on the last reported periodic RI for the CSI process. In other cases, the CQI is calculated based on the last reported periodic RI. The terminal device 1, in a case of other transmission mode than a prescribed transmission mode (e.g., transmission mode 4, 8, 9, or 10), calculates the CQI (and the PMI) conditioned on transmission rank 1.

Figure 4:
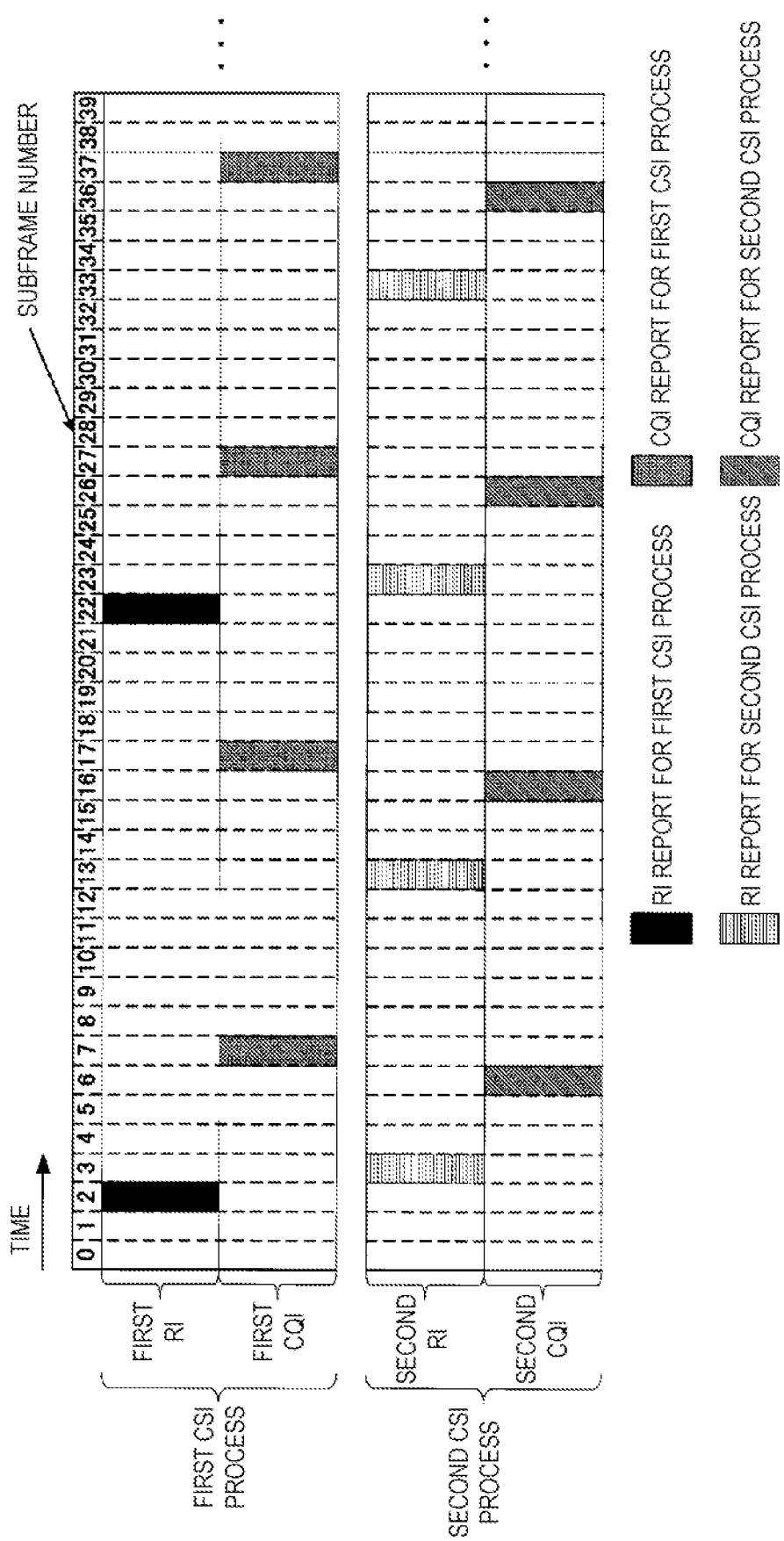
FIG. 4 is a diagram for illustrating one example of a method for RI report and CQI report in the present embodiment.

FIG. 4 illustrates a case that the terminal device 1 configured in transmission mode 10 in a certain serving cell performs first RI report and first CQI report for a first CSI process in the serving cell, and performs second RI report and second CQI report for a second CSI process in the serving cell. Assume that the first CSI process as a RI-reference CSI process is configured for the second CSI process. Here, a value of the second RI for the second CSI process reported in subframe number 3 and subframe number 13 is the same value of a RI reported in subframe number 2. Here, in a case that the second RI for the second CSI process reported in subframe number 23 is dropped depending on any condition described below, the second CQI for the second CSI process reported in subframe number 26 is calculated based on a RI for the first CSI process that is a RI-reference CSI process reported in subframe number 22.

In a case of reporting mode 2-0, the RI and the CQI are calculated as below.

(RI in reporting mode 2-0) In the subframe where RI is reported, in the case of transmission mode 3, the terminal device 1 determines the RI assuming transmission on the set S subbands and reports the RI with reporting type 3.

(Wideband CQI in reporting mode 2-0) In the subframe where wideband CQI is reported, the terminal device 1 reports the CSI with reporting type 4 constituted of a single wideband CQI calculated assuming transmission on all frequency bands possibly configured as a subband. In this case, in the case of transmission mode 3, the CQI is calculated based on the last reported periodic RI. In the case of other transmission modes, the CQI corresponding to reporting mode 2-0 is calculated conditioned on rank 1.

(Subband CQI in reporting mode 2-0) In the subframe where selected subband CQI is reported, the terminal device 1 reports a value of a CQI reflecting only transmission on the subband with reporting type 1. The value of the CQI corresponding to reporting mode 2-0 represents only channel quality for a first codeword even when the RI is larger than one. The terminal device 1 in the case of transmission mode 3 calculates the subband selection and CQI values conditioned on the last reported periodic RI, and in the case of other transmission modes, calculates subband selection and CQI values corresponding to reporting mode 2-0 conditioned on rank 1.

In a case of reporting mode 2-1, the RI and the CQI are calculated as below.

(RI in reporting mode 2-1) In the subframe where RI is reported, in a case that the terminal device 1 is configured in transmission mode 10 with a RI-reference CSI process for a certain CSI process, the terminal device 1, regardless of the configuration of the subframe set, sets a RI for the CSI process to the same value of the RI in the most recent CSI report including a RI for the configured RI-reference CSI process. In other cases, the terminal device 1 determines the RI assuming transmission on all frequency bands possibly configured as a subband. The terminal device 1 reports the determined RI with reporting type 3 (in a case without PTI) or reporting type 6 (in a case with PTI).

(Wideband CQI in reporting mode 2-1) In the subframe where wideband CQI is reported, the terminal device 1 in the case of a prescribed transmission mode (e.g., transmission mode 4, 8, 9, or 10) reports the wideband CQI as below. In a case that the terminal device 1 is configured in transmission mode 10 with a RI-reference CSI process for a certain CSI process, and the most recent reporting type 3 report for the CSI process is dropped, and the most recent reporting type 3 report in the RI-reference CSI process for the CSI process is reported, the CQI for the CSI process is calculated based on the periodic RI reported in the RI-reference CSI process. In other cases, the CQI is calculated based on the last reported periodic RI for the CSI process. The terminal device 1, in a case of other transmission mode than a prescribed transmission mode (e.g., transmission mode 4, 8, 9, or 10), calculates the wideband CQI in reporting mode 2-1 conditioned on transmission rank 1.

(Subband CQI in reporting mode 2-1) In the subframe where selected subband CQI is reported, the terminal device 1 reports a value of a CQI for the first codeword reflecting only transmission on the subband with reporting type 1. In this case, when the RI is larger than one, the terminal device 1 reports a difference between a subband CQI index for a second codeword and a subband CQI index for the first codeword with adding 3 bits to subband CQI. The terminal device 1 in the case of a prescribed transmission mode (e.g., transmission mode 4, 8, 9, or 10) reports the subband CQI as below. In a case that the terminal device 1 is configured in transmission mode 10 with a RI-reference CSI process for a certain CSI process, and the most recent reporting type 3 report for the CSI process is dropped, and the most recent reporting type 3 report is reported in the RI-reference CSI process for the CSI process, subband selection and CQI values for the CSI process is calculated based on the periodic RI reported in the RI-reference CSI process. In other cases, the subband selection and CQI values for the CSI process are calculated based on the last reported periodic RI. The terminal device 1, in a case of other transmission mode than a prescribed transmission mode (e.g., transmission mode 4, 8, 9, or 10), calculates the subband selection and CQI values conditioned on transmission rank 1.

Hereinafter, operations for simultaneously reporting one or multiple RIs according to the present embodiment will be described.

The terminal device 1 may be configured with the PUCCH format for RI report in each configured serving cell. For example, the terminal device 1 may be configured with an available PUCCH format among the third PUCCH format, the fourth PUCCH format, and the fifth PUCCH format for RI report in each configured serving cell.

The terminal device 1 may be configured with the PUCCH format for RI report for each configured subframe set. For example, the terminal device 1 may be configured with an available PUCCH format among the third PUCCH format, the fourth PUCCH format, and the fifth PUCCH format for RI report in each configured subframe set.

The terminal device 1 may be configured with the PUCCH format for RI report in each configured CSI process. For example, the terminal device 1 may be configured with an available PUCCH format among the third PUCCH format, the fourth PUCCH format, and the fifth PUCCH format for RI report in each configured CSI process.

A configuration may be made in common in all the serving cells of whether a format capable of simultaneously reporting multiple CSIs (e.g., the fifth PUCCH format) can be used for the terminal device 1. A configuration may be made in common in all the subframe sets of whether a format capable of simultaneously reporting multiple CSIs (e.g., the fifth PUCCH format) can be used for the terminal device 1. A configuration may be made in common in all the CSI processes of whether a format capable of simultaneously reporting multiple CSIs (e.g., the fifth PUCCH format) can be used for the terminal device 1. A configuration may be made of whether a format capable of simultaneously reporting multiple CSIs is applicable to the system managing the terminal device 1, or a format capable of simultaneously reporting multiple CSIs may be configured for the terminal device 1 through the higher layer signaling.

In a case that a certain PUCCH (assuming a first PUCCH) is configured with a PUCCH format capable of reporting only one CSI (e.g., the third PUCCH format), another certain PUCCH (assuming a second PUCCH) is configured with a format capable of simultaneously reporting multiple CSIs (e.g., the fifth PUCCH format), and the first PUCCH collides with the second PUCCH, the CSI to be reported on the first PUCCH and the CSI to be reported on the second PUCCH may be processed to be simultaneously reported on the second PUCCH.

In other words, in a case that transmission on the first PUCCH resource used to report one CSI in the third PUCCH format collides with transmission on the second PUCCH resource used to simultaneously report multiple CSIs in the fifth PUCCH format, some or all of the one CSI and/or the multiple CSIs may be reported on the second PUCCH resource. To be more specific, in a case that one CSI reporting using the third PUCCH format and/or the first PUCCH resource collides with multiple CSI reports using the fifth PUCCH format and/or the second PUCCH resource, some or all of the one CSI and/or the multiple CSIs may be reported using the fifth PUCCH format and/or the second PUCCH resource.

Here, for example, the first PUCCH may be a PUCCH used for CSI report for the second CSI process in a certain serving cell (a first serving cell), and the second PUCCH may be a PUCCH used for CSI report in another serving cell (a second serving cell). In other words, in a case that a first CSI for the first CSI process in the first serving cell is reported on a PUCCH using any PUCCH format, a second CSI for the second CSI process in the first serving cell is reported on a PUCCH using the third PUCCH format, a CSI for the second serving cell is reported on a PUCCH using the fifth PUCCH format, and the second CSI report collides with the CSI report for the second serving cell in a certain subframe, the terminal device 1 may report the second CSI and the CSI for the second serving cell colliding with each other on the PUCCH using the fifth PUCCH format.

Moreover, for example, the first PUCCH may be a PUCCH used for CSI report for a second subframe set in a certain serving cell (the first serving cell), and the second PUCCH may be a PUCCH used for CSI reporting in another serving cell (the second serving cell). In other words, in a case that a first CSI for a first subframe set in the first serving cell is reported on a PUCCH using any PUCCH format, a second CSI for the second subframe set in the first serving cell is reported on a PUCCH using the third PUCCH format, a CSI for the second serving cell is reported on a PUCCH using the fifth PUCCH format, and the second CSI report collides with the CSI report for the second serving cell in a certain subframe, the terminal device 1 may report the second CSI and the CSI for the second serving cell colliding with each other on the PUCCH using the fifth PUCCH format.

However, in a case that the first PUCCH is configured with a format capable of simultaneously reporting multiple CSIs (e.g., the fifth PUCCH format), the second PUCCH is configured with a format capable of simultaneously reporting multiple CSIs (e.g., the fifth PUCCH format), and the first PUCCH collides with the second PUCCH, the CSI reported on the first PUCCH and the CSI reported on the second PUCCH may be processed to be simultaneously reported on any one of the first PUCCH and the second PUCCH.

In other words, in a case that transmission on the first PUCCH resource used to simultaneously report the first multiple CSIs and using the fifth PUCCH format collides with transmission on the second PUCCH resource used to simultaneously report the second multiple CSIs and using the fifth PUCCH format, some or all of the first multiple CSIs and/or the second multiple CSIs may be reported on the first PUCCH resource or the second PUCCH resource. In other words, in a case that the first multiple CSI reports using the fifth PUCCH format and/or the first PUCCH resource collides with the second multiple CSI reports using the fifth PUCCH format and/or the second PUCCH resource, some or all of the first multiple CSIs and/or the second multiple CSIs may be reported using the first PUCCH resource and/or the second PUCCH resource. Here, some or all of the first multiple CSIs and/or the second multiple CSIs may be reported with the fifth PUCCH format.

Here, for example, the first PUCCH may be a PUCCH used for CSI report for the second CSI process in a certain serving cell (a first serving cell), and the second PUCCH may be a PUCCH used for CSI report in another serving cell (a second serving cell). In other words, in a case that the first CSI for the first CSI process in the first serving cell is reported on a PUCCH using any PUCCH format, the second CSI for the second CSI process in the first serving cell is reported on a PUCCH using the fifth PUCCH format, the CSI for the second serving cell is reported on a PUCCH using the fifth PUCCH format, and the second CSI report collides with the CSI report for the second serving cell in a certain subframe, the terminal device 1 may report the second CSI and the CSI for the second serving cell colliding with each other on the PUCCH using the fifth PUCCH format.

Moreover, for example, the first PUCCH may be a PUCCH used for CSI report for a second subframe set in a certain serving cell (the first serving cell), and the second PUCCH may be a PUCCH used for CSI reporting in another serving cell (the second serving cell). In other words, in a case that the first CSI for the first subframe set in the first serving cell is reported on a PUCCH using any PUCCH format, the second CSI for the second subframe set in the first serving cell is reported on a PUCCH using the fifth PUCCH format, the CSI for the second serving cell is reported on a PUCCH using the fifth PUCCH format, and the second CSI report collides with the CSI report for the second serving cell in a certain subframe, the terminal device 1 may report the second CSI and the CSI for the second serving cell colliding with each other on the PUCCH using the fifth PUCCH format.

However, in a case that the first PUCCH is configured with a PUCCH format capable of reporting only one CSI (e.g., the third PUCCH format), the second PUCCH is configured with a PUCCH format capable of reporting only one CSI (e.g., the third PUCCH format), and the first PUCCH collides with the second PUCCH, any one of the CSI report reported on the first PUCCH and the CSI report reported on the second PUCCH may be processed to be dropped.

Here, for example, the first PUCCH may be a PUCCH used for CSI report for the second CSI process in a certain serving cell (a first serving cell), and the second PUCCH may be a PUCCH used for CSI report in another serving cell (a second serving cell). In other words, in a case that the first CSI for the first CSI process in the first serving cell is reported on a PUCCH using any PUCCH format, the second CSI for the second CSI process in the first serving cell is reported on a PUCCH using the third PUCCH format, the CSI for the second serving cell is reported on a PUCCH using the third PUCCH format, and the second CSI report collides with the CSI report for the second serving cell in a certain subframe, the terminal device 1 may drop any one of the second CSI and the CSI for the second serving cell colliding with each other.

Moreover, for example, the first PUCCH may be a PUCCH used for CSI report for a second subframe set in a certain serving cell (the first serving cell), and the second PUCCH may be a PUCCH used for CSI reporting in another serving cell (the second serving cell). In other words, in a case that the first CSI for the first subframe set in the first serving cell is reported on a PUCCH using any PUCCH format, the second CSI for the second subframe set in the first serving cell is reported on a PUCCH using the third PUCCH format, the CSI for the second serving cell is reported on a PUCCH using the third PUCCH format, and the second CSI report collides with the CSI report for the second serving cell in a certain subframe, the terminal device 1 may drop any one of the second CSI and the CSI for the second serving cell colliding with each other.

In this case, in a case that the first PUCCH is configured with a PUCCH format capable of reporting only one CSI (e.g., the third PUCCH format), the second PUCCH is configured with a PUCCH format capable of reporting only one CSI (e.g., the third PUCCH format), the terminal device 1 is configure with a format capable of simultaneously reporting multiple CSIs (e.g., the fifth PUCCH format), and the first PUCCH collides with the second PUCCH, the CSI to be reported on the first PUCCH and the CSI to be reported on the second PUCCH may be processed to be simultaneously reported with the format capable of simultaneously reporting multiple CSIs.

In this case, in a case that the first PUCCH is configured with a PUCCH format capable of reporting only one CSI (e.g., the third PUCCH format), the second PUCCH is configured with a PUCCH format capable of reporting only one CSI (e.g., the third PUCCH format), the terminal device 1 is not configured with a format capable of simultaneously reporting multiple CSIs (e.g., the fifth PUCCH format), and the first PUCCH collides with the second PUCCH, any one of the CSI report on the first PUCCH and the CSI report on the second PUCCH may be processed to be dropped.

To be more specific, in a case that a first one CSI report with the third PUCCH format and/or the first PUCCH resource collides with a second one CSI report with the third PUCCH format and/or the second PUCCH resource, the terminal device configured with the fifth PUCCH format used to simultaneously report multiple CSIs (or configured to transmit the uplink control information with the fifth PUCCH format) may report some or all of the first one CSI and/or the second one CSI with the fifth PUCCH format. Here, some or all of the first one CSI and/or the second one CSI may be reported on the PUCCH resource using the fifth PUCCH format.

Here, for example, the first PUCCH may be a PUCCH used for CSI report for the second CSI process in a certain serving cell (a first serving cell), and the second PUCCH may be a PUCCH used for CSI report in another serving cell (a second serving cell). In other words, in a case that the first CSI for the first CSI process in the first serving cell is reported on a PUCCH using any PUCCH format, the second CSI for the second CSI process in the first serving cell is reported on a PUCCH using the third PUCCH format, the CSI for the second serving cell is reported on a PUCCH using the third PUCCH format, and the second CSI report collides with the CSI report for the second serving cell in a certain subframe, the terminal device 1 configured with the fifth PUCCH format may report the second CSI and the CSI for the second serving cell colliding with each other on the PUCCH using the fifth PUCCH format, and the terminal device 1 not configured with the fifth PUCCH format may drop any one of the second CSI and the CSI for the second serving cell colliding with each other.

Moreover, for example, the first PUCCH may be a PUCCH used for CSI report for a second subframe set in a certain serving cell (the first serving cell), and the second PUCCH may be a PUCCH used for CSI reporting in another serving cell (the second serving cell). In other words, in a case that the first CSI for the first subframe set in the first serving cell is reported on a PUCCH using any PUCCH format, the second CSI for the second subframe set in the first serving cell is reported on a PUCCH using the third PUCCH format, the CSI for the second serving cell is reported on a PUCCH using the third PUCCH format, and the second CSI report collides with the CSI report for the second serving cell in a certain subframe, the terminal device 1 configured with the fifth PUCCH format may report the second CSI and the CSI for the second serving cell colliding with each other on the PUCCH using the fifth PUCCH format, and the terminal device 1 not configured with the fifth PUCCH format may drop any one of the second CSI and the CSI for the second serving cell colliding with each other.

In a case that the terminal device 1 can simultaneously report all the colliding CSIs with an applicable PUCCH format in the case that multiple CSI reports collide with each other in a certain subframe, the terminal device 1 may not drop but report all the CSIs. In this case, in a case that the terminal device 1 is configured in a transmission mode capable of configuring multiple CSI processes (e.g., transmission mode 10) in a certain serving cell, and a CSI associated with a certain CSI process collides with a CSI associated with a RI-reference CSI process for the certain CSI process in a certain serving cell, the terminal device 1 may drop any one of the CSI reports. For example, the dropped CSI report may be a CSI report associated with the certain CSI process configured with a RI-reference CSI process.

In other words, the terminal device 1 may report a CSI associated with the first CSI process with one PUCCH (PUCCH resource) in one subframe. Moreover, the terminal device 1 may report a CSI associated with the second CSI process different from the first CSI process with one PUCCH (PUCCH resource) in one subframe. Here, a PUCCH format for reporting one CSI may be used to report the CSI associated with the first CSI process. A PUCCH format for reporting one CSI may be used to report the CSI associated with the second CSI process.

Here, in a case that the CSI report associated with the first CSI process collides with the CSI report associated with the second CSI process in one subframe, the terminal device 1 may report some or all of the CSI associated with the first CSI process and the CSI associated with the second CSI process in the one subframe with one PUCCH (PUCCH resource). Here, the first CSI process is not a RI-reference CSI process for the second CSI process. A PUCCH format for simultaneously reporting multiple CSIs may be used to report some or all of the CSI associated with the first CSI process and the CSI associated with the second CSI process.

In the case that the CSI report associated with the first CSI process collides with the CSI report associated with the second CSI process in one subframe, the terminal device 1 may report any one of the CSI associated with the first CSI process and the CSI associated with the second CSI process in the one subframe with one PUCCH (PUCCH resource). In other words, the terminal device 1 may drop the CSI report associated with the first CSI process, and report only the CSI associated with the second CSI process. Moreover, the terminal device 1 may drop the CSI report associated with the second CSI process, and report only the CSI associated with the first CSI process. Here, the first CSI process is a RI-reference CSI process for the second CSI process. A PUCCH format for simultaneously reporting multiple CSIs may be used to report the CSI associated with the first CSI process or the CSI associated with the second CSI process.

In other words, the terminal device 1 may switch, based on whether the first CSI process is a RI-reference CSI process for the second CSI process, between reporting both the CSI associated with the first CSI process and the CSI associated with the second CSI process, and dropping (reporting) any one of the CSI associated with the first CSI process and the CSI associated with the second CSI process. Here, which of the CSI associated with the first CSI process and the CSI associated with the second CSI process is dropped (a dropping rule, priority) is described below.

Figure 5:
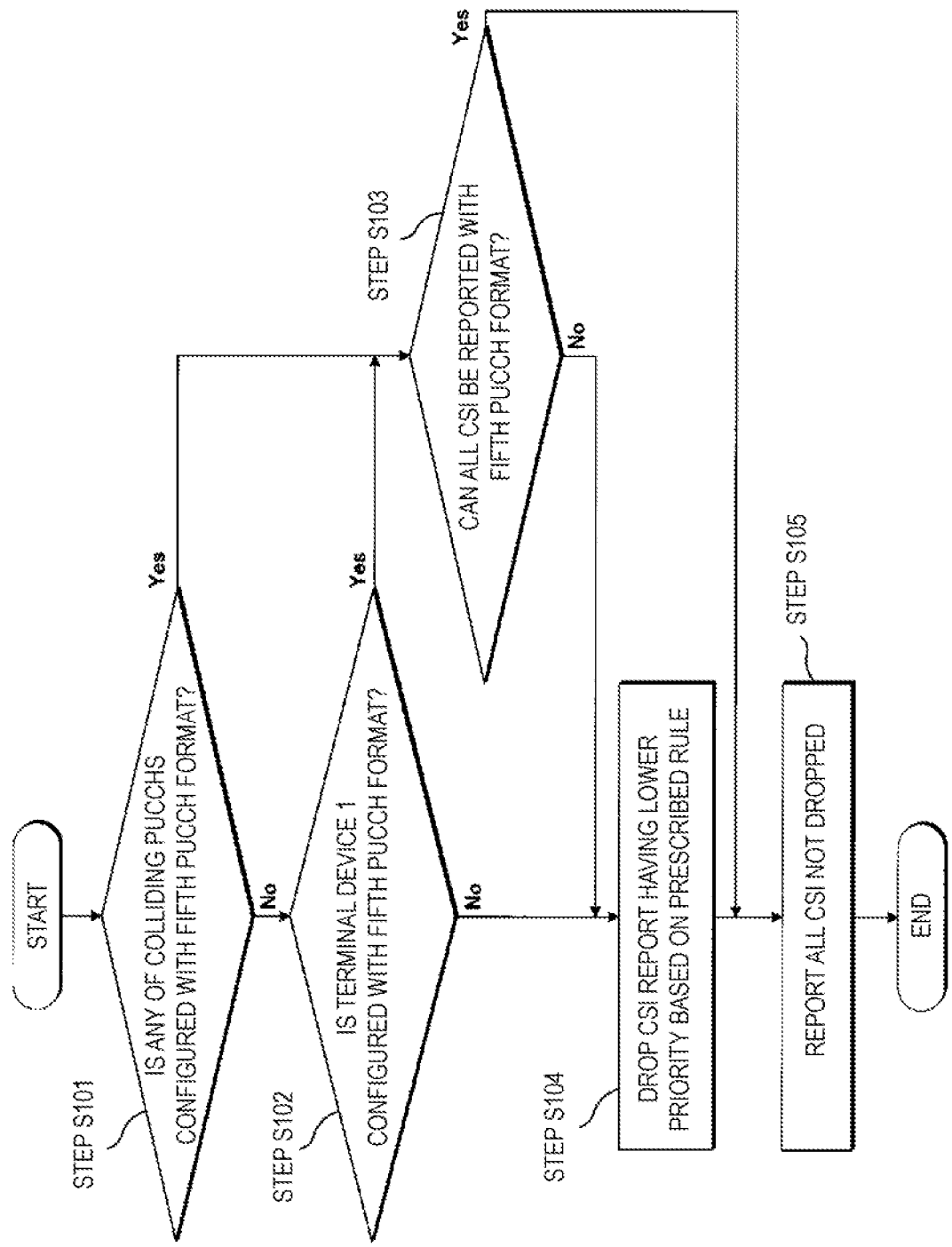
FIG. 5 is a flow diagram illustrating one example of an operation of a terminal device 1 in a case that multiple PUCCHs collide with each other in the present embodiment.

FIG. 5 is a flow diagram illustrating one example of an operation of the terminal device 1 in a case that multiple PUCCHs each of which transmits a CSI with a prescribed PUCCH format collide with each other. However, the fifth PUCCH format in the flow diagram may be any format capable of simultaneously reporting multiple CSIs.

At step S101, in a case that any of the colliding PUCCHs is configured with the fifth PUCCH format(S101-Yes), the procedure proceeds to step S103, or in a case not configured (S101-No), the procedure proceeds to step S102. At step S102, in a case that the terminal device 1 is configured with the fifth PUCCH format (S102-Yes), the procedure proceeds to S103, or in a case not configured (S102-No), the procedure proceeds to step S104. At step S103, in a case that all the colliding CSIs can be reported with the applicable fifth PUCCH format (S103-Yes), the procedure proceeds to step S105, or in a case cannot be reported (S103-No), the procedure proceeds to step S104. At step S104, the terminal device 1 drops a CSI report having lower priority based on a prescribed rule described below until the CSIs becomes able to be reported with the applicable PUCCH format. At step S105, the terminal device 1 reports all the CSIs not dropped with the applicable PUCCH format.

In a case that the terminal device 1 is configured in a transmission mode capable of configuring multiple CSI processes (e.g., transmission mode 10) in a certain serving cell, and a CSI report (or RI report) associated with a certain CSI process collides with a CSI report (or RI report) associated with a CSI process configured with a RI-reference CSI process the same as for the certain CSI process, the terminal device 1 may drop any one of the CSI reports as that having the lowest priority. For example, the dropped CSI report may be a CSI report associated with the CSI process configured with a RI-reference CSI process.

Figure 6:
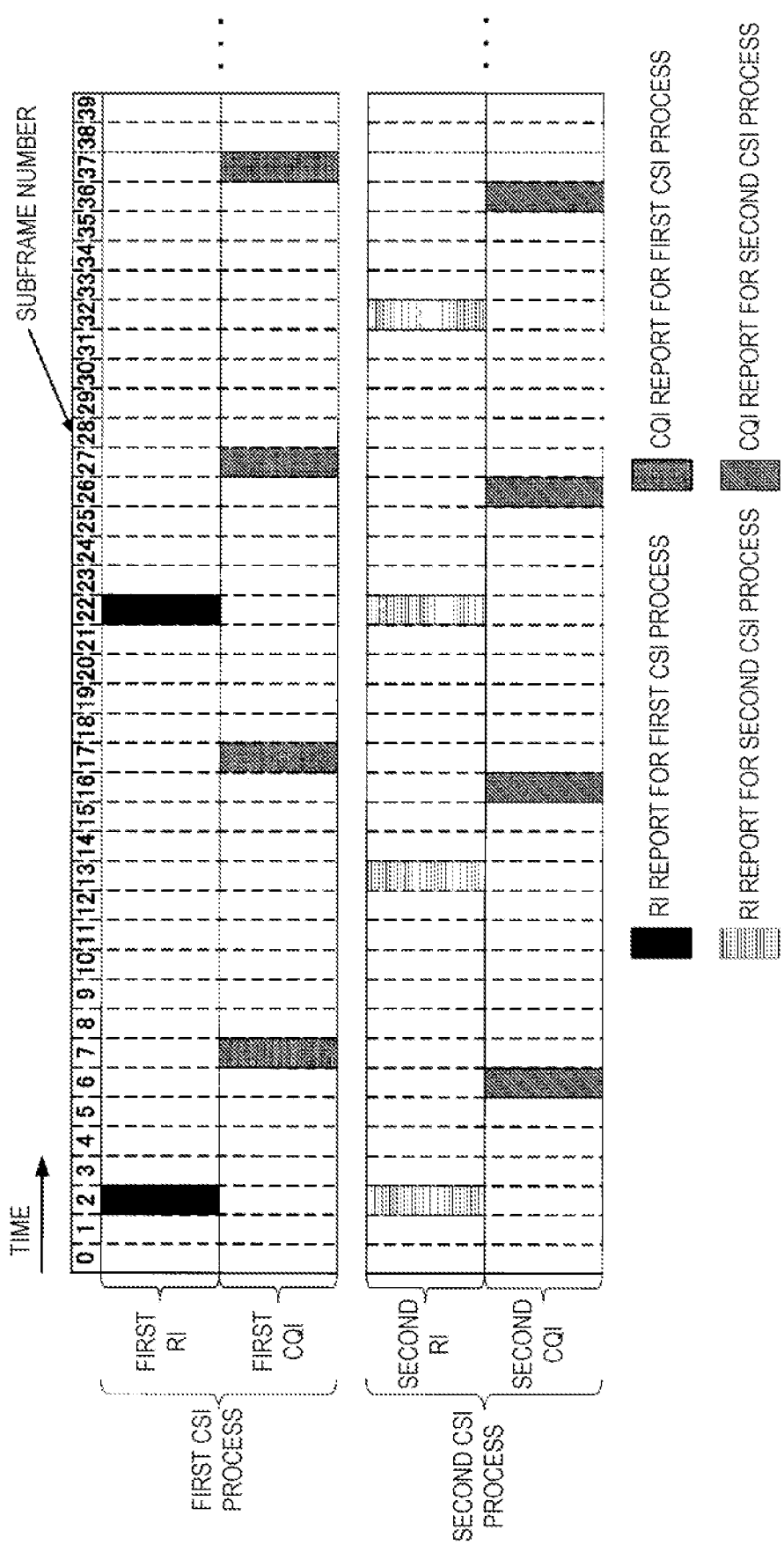
FIG. 6 is a diagram for describing one example of a dropping rule in a case that multiple CSI reports collide with each other in the present embodiment.

FIG. 6 is a diagram for describing one example of a dropping rule in a case that multiple CSI reports collide with each other. FIG. 6 illustrates a case that the terminal device 1 configured in transmission mode 10 in a certain serving cell reports a first RI report and a first CQI report for a first CSI process in the serving cell, and reports a second RI report and a second CQI report for a second CSI process in the serving cell. Here, assume that the first RI report for the first CSI process collides with the second RI report for the second CSI process in subframe number 2 and subframe number 22.

In a case that a PUCCH format capable of simultaneously reporting multiple CSIs is not applicable to the first RI report and the second RI report, the terminal device 1 drops any of the first RI report and the second RI report in subframe number 2 and subframe number 22. The dropped RI report may be selected in accordance with a rule described below.

In a case that a PUCCH format capable of simultaneously reporting multiple CSIs is applicable to the first RI report and the second RI report, the terminal device 1 may process the reporting as below. In the case that the first CSI process is a RI-reference CSI process for the second CSI process, the terminal device 1 may drop the second RI report colliding with the first RI report. In this case, the second CQI for the second CSI process in subframe number 6 may be calculated based on the first RI for the first CSI process reported in subframe number 2, and the second CQI for the second CSI process in subframe number 26 may be calculated based on the first RI for the first CSI process reported in subframe number 22. In a case that the first CSI process is not a RI-reference CSI process for the second CSI process, the terminal device 1 may report both the first RI and the second RI with applying a PUCCH format capable of simultaneously reporting multiple CSIs.

Figure 7:
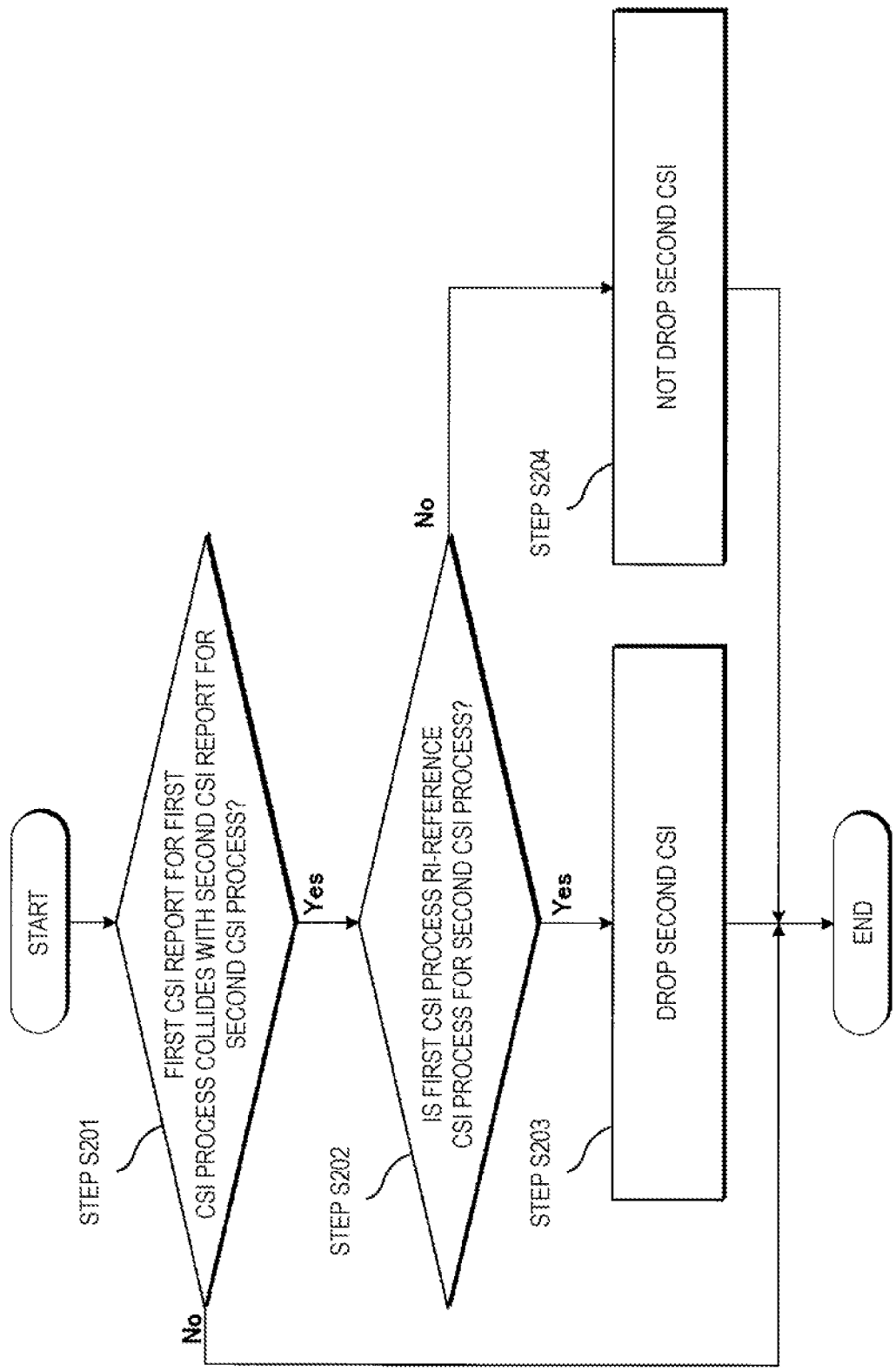
FIG. 7 is a flow diagram illustrating one example of an operation of the terminal device 1 in the case that multiple CSI reports collide with each other in the present embodiment.

FIG. 7 is a flow diagram illustrating one example of an operation of the terminal device 1 in a case that multiple CSI reports collide with each other in a state where a transmission mode capable of configuring multiple CSI processes (e.g., transmission mode 10) is configured and a format capable of simultaneously reporting multiple CSIs (e.g., the fifth PUCCH format) can be used. The operation of the flow diagram in FIG. 7 may be added immediately before step S103 in FIG. 5 (that is, between step S101-Yes and step S103 and/or between step S102-Yes and step S103), for example. The first CSI report and second CSI report in FIG. 7 may be the first RI report and the second RI report, respectively.

At step S201, in a case that the first CSI report for the first CSI process collides with the second CSI report for the second CSI process (S201-Yes), the procedure proceeds to step S202, or in a case not collide (S201-No), the operation is terminated. The first CSI report and second CSI report at step S201 are preferably applied to all the colliding CSI reports. At step S202, in a case that the first CSI process is a RI-reference CSI process for the second CSI process (S202-Yes), the procedure proceeds to step S203, or in a case that the first CSI process is not a RI-reference CSI process for the second CSI process (S202-No), the procedure proceeds to step S204. At step S203, the second CSI report for the second CSI process for which a RI-reference CSI process is configured for the first CSI process is dropped, and the operation is terminated. At step S204, the second CSI report for the second CSI process is not dropped, and the operation is terminated.

In this way, even in a state where a format capable of simultaneously reporting multiple CSIs (e.g., the fifth PUCCH format) is usable, the CSI report for the CSI process for which a RI-reference CSI process is configured for another CSI process is dropped to allow the PUCCH resource used for reporting to be saved.

The above description illustrates the operation of dropping the CSI report for the CSI process configured with a RI-reference CSI process colliding with the CSI report for the referenced CSI process, but the terminal device 1 may operate to drop the CSI report for the CSI process for which a RI-reference CSI process is configured for another CSI process colliding with any CSI report.

Hereinafter, a priority rule in the case that multiple CSI reports collide with each other in the present embodiment will be described.

In a case that the CSI report with reporting type 3, 5, or 6 of a certain serving cell collides with the CSI report with reporting type 1, 1a, 2, 2a, 2b, 2c, or 4 of the same serving cell, and all the colliding CSIs cannot simultaneously be reported with the applicable PUCCH format, the terminal device 1 sets the latter CSI report (with reporting type 1, 1a, 2, 2a, 2b, 2c, or 4) as a CSI report with a reporting type of lower priority.

In a case that the terminal device 1 is configured in a transmission mode capable of configuring multiple CSI processes (e.g., transmission mode 10) in a certain serving cell, and multiple CSI reports with a reporting type of the same priority and for different CSI processes collide with each other, and all the colliding CSIs cannot be simultaneously reported with the applicable PUCCH format, the terminal device 1 sets the CSI for the CSI process with a larger CSI process index as a CSI report for a CSI process of lower priority.

In a case that the terminal device 1 is configured in a transmission mode capable of configuring one CSI process (e.g., transmission modes 1 to 9) in a certain serving cell, a CSI subframe set 0 and CSI subframe set 1 are configured by a higher layer parameter, the CSI reports with a reporting type of the same priority in the same serving cell collide with each other, and all the colliding CSIs cannot be simultaneously reported with the applicable PUCCH format, the terminal device 1 sets a CSI report for CSI subframe set 1 as a CSI report for a subframe set of lower priority.

In a case that the terminal device 1 is configured in a transmission mode capable of configuring multiple CSI processes (e.g., transmission mode 10) in a certain serving cell, CSI subframe set 0 and CSI subframe set 1 are configured by a higher layer parameter, the CSI reports of the same serving cell with a reporting type of the same priority and indexed by the same CSI process index collide with each other, and all the colliding CSIs cannot be simultaneously reported with the applicable PUCCH format, the terminal device 1 sets a CSI report for CSI subframe set 1 as a CSI report for a subframe set of lower priority.

In a case that the terminal device 1 is configured with multiple serving cell and a PUCCH format capable of reporting only a CSI for one serving cell is applied to the terminal device 1, the terminal device 1 transmits a CSI report for only one serving cell per a subframe. In a case that in a certain subframe the CSI report with reporting type 3, 5, 6, or 2a of a certain serving cell collides with the CSI report with reporting type 1, 1a, 2, 2b, 2c, or 4 of anther serving cell, and all the colliding CSIs cannot be simultaneously reported with the applicable PUCCH format, the latter CSI report (with reporting type 1, 1a, 2, 2b, 2c, or 4) is set as a CSI report with a reporting type of lower priority.

In a case that in a certain subframe the CSI report with reporting type 2, 2b, 2c, or 4 of a certain serving cell collides with the CSI report with reporting type 1 or 1a of anther serving cell, and all the colliding CSIs cannot be simultaneously reported with the applicable PUCCH format, the latter CSI report (with reporting type 1 or 1a) is set as a CSI report with a reporting type of lower priority.

In a case that the terminal device 1 is configured in a transmission mode capable of configuring one CSI process (e.g., transmission modes 1 to 9) in multiple serving cells in a certain subframe, the CSI reports of different serving cells with a reporting type of the same priority collide with each other, and all the colliding CSIs cannot be simultaneously reported with the applicable PUCCH format, the terminal device 1 sets a CSI report for a serving cell with a larger cell index configured by the higher layer as a CSI report for a serving cell of lower priority.

In a case that the terminal device 1 is configured in a transmission mode capable of configuring multiple CSI processes (e.g., transmission mode 10) in multiple serving cells in a certain subframe, the CSI reports of different serving cells with a reporting type of the same priority and with the same CSI process index collide with each other, and all the colliding CSIs cannot be simultaneously reported with the applicable PUCCH format, the terminal device 1 sets a CSI report for a serving cell with a larger cell index configured by the higher layer as a CSI report for a serving cell of lower priority.

In a case that the terminal device 1 is configured in a transmission mode capable of configuring multiple CSI processes (e.g., transmission mode 10) in multiple serving cells in a certain subframe, the CSI reports of different serving cells with a reporting type of the same priority and with different CSI process indexes collide with each other, and all the colliding CSIs cannot be simultaneously reported with the applicable PUCCH format, the terminal device 1 sets a CSI report for a serving cell involving a CSI for a CSI process with a larger CSI process index as a CSI report for a serving cell of lower priority.

In a case that in a certain subframe the CSI report of the serving cell configured with a transmission mode capable of configuring one CSI process (e.g., transmission modes 1 to 9) collides with the CSI reports of different serving cells configured with a transmission mode capable of configuring multiple CSI processes (e.g., transmission mode 10), the CSI reporting type priorities for these serving cells are identical, and all the colliding CSIs cannot be simultaneously reported with the applicable PUCCH format, the terminal device 1 sets, for a CSI report with a CSI process index larger than one for the latter serving cell, a CSI report for a CSI process with a larger CSI process index as a CSI report for a CSI process of lower priority.

In a case that in a certain subframe the CSI report of the serving cell configured with a transmission mode capable of configuring one CSI process (e.g., transmission modes 1 to 9) collides with the CSI report for a CSI process of different serving cell configured with a transmission mode capable of configuring multiple CSI processes (e.g., transmission mode 10), a CSI process index of the CSI process being one, and the CSI reporting type priorities for these serving cells are identical, the terminal device 1 sets a CSI report for a serving cell with a larger cell index configured by the higher layer as a CSI report for serving cell of lower priority.

In a case that multiple CSI reports collide with each other and all the colliding CSIs cannot be simultaneously reported with the applied PUCCH format, the terminal device 1 drops the CSI report with lower priority in accordance with the rule described above. As the CSI report with lower priority is dropped, at a point of time when the rest of CSI reports that are not dropped becomes able to be simultaneously reported with the applied PUCCH format, the dropping process may be terminated to perform the CSI reporting process.

However, as described above, In a case that at least some of the colliding multiple CSI reports include the CSI report for the CSI process configured with a RI-reference CSI process and the CSI report for the referenced CSI process, the CSI report for the CSI process configured with a RI-reference CSI process may be dropped regardless of whether the CSIs can be simultaneously reported with the applied PUCCH format.

The method/process relating to the transmission of the uplink control information have been described above referring to the drawings, but the specific configuration is not limited to the above description and includes an amendment to a design or the like that falls within the scope not departing from the gist of the present invention. Furthermore, as for the present embodiment, embodiments that are made by suitably combining the method/process described above are also included in the technical scope of the present invention.

A configuration of devices according to the present embodiment will be described below.

Figure 8:
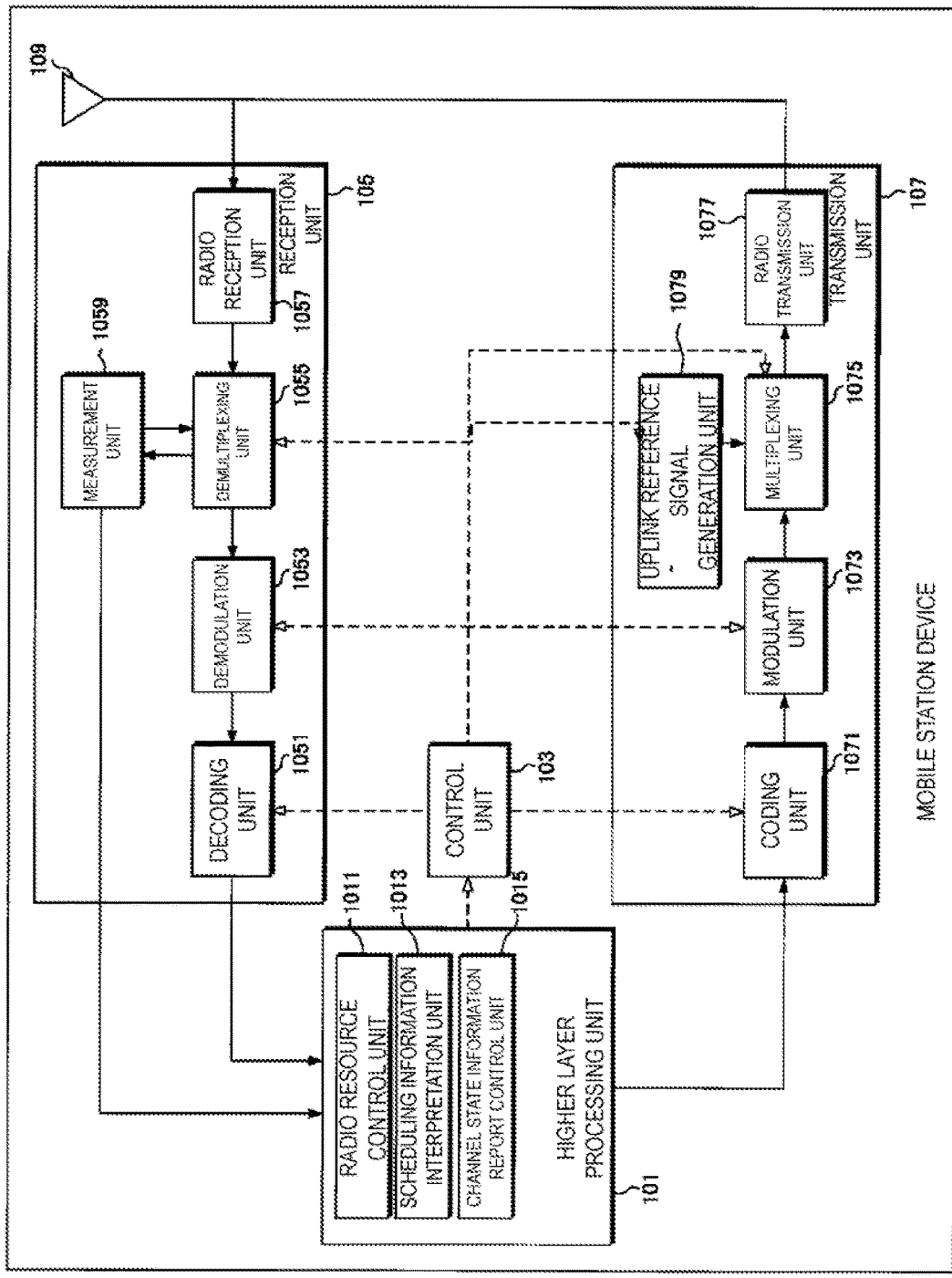
FIG. 8 is a schematic block diagram illustrating a configuration of the terminal device 1 according to the present embodiment.

FIG. 8 is a schematic block diagram illustrating a configuration of the terminal device 1 according to the present embodiment. As illustrated in FIG. 8, the terminal device 1 is configured to include a higher layer processing unit 101, a control unit 103, a reception unit 105, a transmission unit 107, and a transmit and receive antenna 109. Furthermore, the higher layer processing unit 101 is configured to include a radio resource control unit 1011, a scheduling information interpretation unit 1013, and a channel state information (CSI) report control unit 1015. Furthermore, the reception unit 105 is configured to include a decoding unit 1051, a demodulation unit 1053, a demultiplexing unit 1055, a radio reception unit 1057, and a measurement unit 1059. The transmission unit 107 is configured to include a coding unit 1071, a modulation unit 1073, a multiplexing unit 1075, a radio transmission unit 1077, and an uplink reference signal generation unit 1079.

The higher layer processing unit 101 outputs the uplink data (the transport block) generated by a user operation or the like, to the transmission unit 107. The higher layer processing unit 101 performs processing of the Medium Access Control (MAC) layer, the Packet Data Convergence Protocol (PDCP) layer, the Radio Link Control (RLC) layer, and the Radio Resource Control (RRC) layer.

The radio resource control unit 1011 included in the higher layer processing unit 101 manages various pieces of configuration information of the terminal device 1 itself. Furthermore, the radio resource control unit 1011 generates information to be mapped to each uplink channel, and outputs the generated information to the transmission unit 107.

The scheduling information interpretation unit 1013 included in the higher layer processing unit 101 interprets the DCI format (scheduling information) received through the reception unit 105, generates control information for control of the reception unit 105 and the transmission unit 107, in accordance with a result of interpreting the DCI format, and outputs the generated control information to the control unit 103.

The CSI report control unit 1015 instructs the measurement unit 1059 to derive the channel state information (RI/PMI/CQI) relating to the CSI reference resource. The CSI report control unit 1015 instructs the transmission unit 107 to transmit the RI/PMI/CQI. The CSI report control unit 1015 sets a configuration that is used when the measurement unit 1059 calculates the CQI.

Based on the control information originating from the higher layer processing unit 101, the control unit 103 generates a control signal for controlling of the reception unit 105 and the transmission unit 107. The control unit 103 outputs the generated control signal to the reception unit 105 and the transmission unit 107 to control the reception unit 105 and the transmission unit 107.

In accordance with the control signal input from the control unit 103, the reception unit 105 demultiplexes, demodulates, and decodes a reception signal received from the base station device 3 through the transmit and receive antenna 109, and outputs the resulting information to the higher layer processing unit 101.

The radio reception unit 1057 converts (down-converts) a downlink signal received through the transmit and receive antenna 109 into a signal of an intermediate frequency, removes unnecessary frequency components, controls an amplification level in such a manner as to suitably maintain a signal level, performs orthogonal demodulation based on an in-phase component and an orthogonal component of the received signal, and converts the resulting orthogonally-demodulated analog signal into a digital signal. The radio reception unit 1057 removes a portion corresponding to a Guard Interval (GI) from the digital signal resulting from the conversion, performs Fast Fourier Transform (FFT) on the signal from which the guard interval has been removed, and extracts a signal in the frequency domain.

The demultiplexing unit 1055 demultiplexes the extracted signal into the PHICH, the PDCCH, the EPDCCH, the PDSCH, and the downlink reference signal. Furthermore, the demultiplexing unit 1055 makes a compensation of channels including the PHICH, the PDCCH, the EPDCCH, and the PDSCH, from a channel estimate input from the measurement unit 1059. Furthermore, the demultiplexing unit 1055 outputs the downlink reference signal resulting from the demultiplexing, to the measurement unit 1059.

The demodulation unit 1053 multiplies the PHICH by a corresponding code for composition, demodulates the resulting composite signal in compliance with a Binary Phase Shift Keying (BPSK) modulation scheme, and outputs a result of the demodulation to the decoding unit 1051. The decoding unit 1051 decodes the PHICH destined for the terminal device 1 itself and outputs the HARQ indicator resulting from the decoding to the higher layer processing unit 101. The demodulation unit 1053 demodulates the PDCCH and/or the EPDCCH in compliance with a QPSK modulation scheme and outputs a result of the demodulation to the decoding unit 1051. The decoding unit 1051 attempts to decode the PDCCH and/or the EPDCCH. In a case of succeeding in the decoding, the decoding unit 1051 outputs downlink control information resulting from the decoding and an RNTI to which the downlink control information corresponds, to the higher layer processing unit 101.

The demodulation unit 1053 demodulates the PDSCH in compliance with a modulation scheme notified with the downlink grant, such as quadrature phase shift keying (QPSK), 16 quadrature amplitude modulation (QAM), or 64 QAM, and outputs a result of the demodulation to the decoding unit 1051. The decoding unit 1051 decodes the data in accordance with information on a coding rate notified with the downlink control information, and outputs, to the higher layer processing unit 101, the downlink data (the transport block) resulting from the decoding.

The measurement unit 1059 performs downlink path loss measurement, channel measurement, and/or interference measurement from the downlink reference signal input from the demultiplexing unit 1055. The measurement unit 1059 outputs the CSI calculated based on a result of the measurement and the result of the measurement to the higher layer processing unit 101. Furthermore, the measurement unit 1059 calculates a downlink channel estimate from the downlink reference signal and outputs the calculated downlink channel estimate to the demultiplexing unit 1055.

The transmission unit 107 generates the uplink reference signal in accordance with the control signal input from the control unit 103, codes and modulates the uplink data (the transport block) input from the higher layer processing unit 101, multiplexes the PUCCH, the PUSCH, and the generated uplink reference signal, and transmits a result of the multiplexing to the base station device 3 through the transmit and receive antenna 109.

The coding unit 1071 codes the uplink control information and uplink data input from the higher layer processing unit 101. The modulation unit 1073 modulates coded bits input from the coding unit 1071, in compliance with the modulation scheme such as BPSK, QPSK, 16 QAM, or 64 QAM.

The uplink reference signal generation unit 1079 generates a sequence acquired according to a rule (formula) prescribed in advance, based on a physical cell identifier (also referred to as a physical cell identity (PCI), a Cell ID, or the like) for identifying the base station device 3, a bandwidth to which the uplink reference signal is mapped, a cyclic shift notified with the uplink grant, a parameter value for generation of a DMRS sequence, and the like.

Based on the information used for the scheduling of the PUSCH, the multiplexing unit 1075 determines the number of PUSCH layers to be spatial-multiplexed, maps multiple pieces of uplink data transmitted on the same PUSCH to multiple layers through Multiple Input Multiple Output Spatial Multiplexing (MIMO SM), and performs precoding on the layers.

In accordance with the control signal input from the control unit 103, the multiplexing unit 1075 performs Discrete Fourier Transform (DFT) on modulation symbols of the PUSCH. Furthermore, the multiplexing unit 1075 multiplexes PUCCH and PUSCH signals and the generated uplink reference signal for each transmit antenna port. To be more specific, the multiplexing unit 1075 maps the PUCCH and PUSCH signals and the generated uplink reference signal to the resource elements for each transmit antenna port.

The radio transmission unit 1077 performs Inverse Fast Fourier Transform (IFFT) on a signal resulting from the multiplexing, performs modulation in compliance with an SC-FDMA scheme, attaches the guard interval to the SC-FDMA-modulated SC-FDMA symbol, generates a baseband digital signal, converts the baseband digital signal into an analog signal, generates an in-phase component and an orthogonal component of an intermediate frequency from the analog signal, removes frequency components unnecessary for the intermediate frequency band, converts (up-converts) the signal of the intermediate frequency into a signal of a high frequency, removes unnecessary frequency components, performs power amplification, and outputs a final result to the transmit and receive antenna 109 for transmission.

Figure 9:
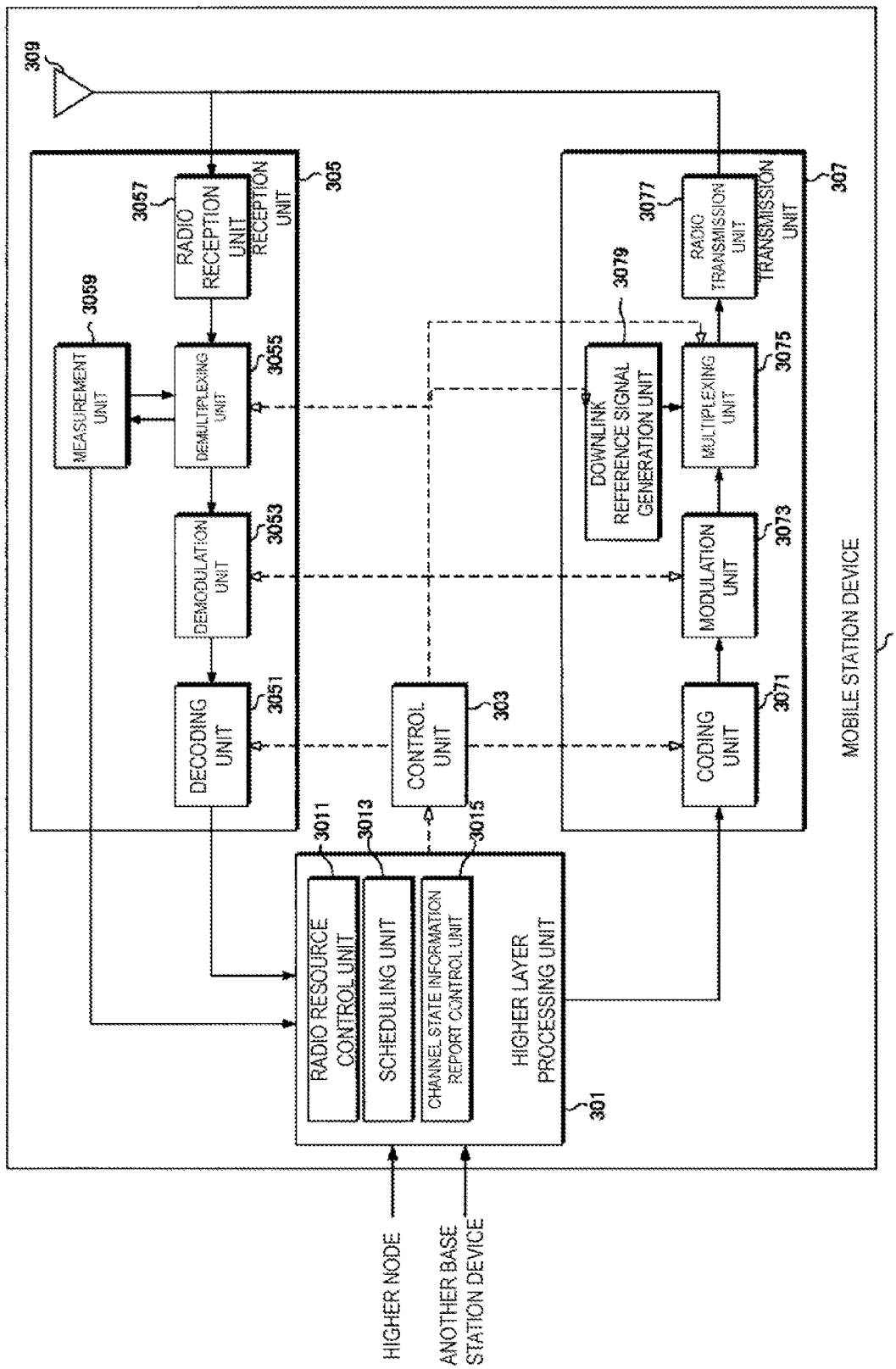
FIG. 9 is a schematic block diagram illustrating a configuration of a base station device 3 according to the present embodiment.

FIG. 9 is a schematic block diagram illustrating a configuration of the base station device 3 according to the present embodiment. As is illustrated, the base station device 3 is configured to include a higher layer processing unit 301, a control unit 303, a reception unit 305, a transmission unit 307, and a transmit and receive antenna 309. The higher layer processing unit 301 is configured to include a radio resource control unit 3011, a scheduling unit 3013, and a CSI report control unit 3015. The reception unit 305 is configured to include a decoding unit 3051, a demodulation unit 3053, a demultiplexing unit 3055, a radio reception unit 3057, and a measurement unit 3059. The transmission unit 307 is configured to include a coding unit 3071, a modulation unit 3073, a multiplexing unit 3075, a radio transmission unit 3077, and a downlink reference signal generation unit 3079.

The higher layer processing unit 301 performs processing of the Medium Access Control (MAC) layer, the Packet Data Convergence Protocol (PDCP) layer, the Radio Link Control (RLC) layer, and the Radio Resource Control (RRC) layer. Furthermore, the higher layer processing unit 301 generates control information for control of the reception unit 305 and the transmission unit 307, and outputs the generated control information to the control unit 303.

The radio resource control unit 3011 included in the higher layer processing unit 301 generates, or acquires from a higher node, the downlink data (the transport block) arranged in the downlink PDSCH, system information, the RRC message, the MAC Control Element (CE), and the like, and outputs a result of the generation or the acquirement to the transmission unit 307. Furthermore, the radio resource control unit 3011 manages various pieces of configuration information on each of the terminal devices 1.

The scheduling unit 3013 included in the higher layer processing unit 301 determines a frequency and a subframe to which the physical channels (the PDSCH and the PUSCH) are allocated, the coding rate and modulation scheme for the physical channels (the PDSCH and the PUSCH), the transmit power, and the like, from the received CSI and from the channel estimate, channel quality, or the like input from the measurement unit 3059. The scheduling unit 3013 generates the control information in order to control the reception unit 305 and the transmission unit 307 in accordance with a result of the scheduling, and outputs the generated information to the control unit 303. The scheduling unit 3013 generates the information (e.g., the DCI format) to be used for the scheduling of the physical channels (the PDSCH and the PUSCH), based on the result of the scheduling.

The CSI report control unit 3015 included in the higher layer processing unit 301 controls a CSI report that is made by the terminal device 1. The CSI report control unit 3015 transmits information that is assumed in order for the terminal device 1 to derive a RI/PMI/CQI in the CSI reference resource and that shows various configurations, to the terminal device 1 through the transmission unit 307.

Based on the control information originating from the higher layer processing unit 301, the control unit 303 generates a control signal for controlling the reception unit 305 and the transmission unit 307. The control unit 303 outputs the generated control signal to the reception unit 305 and the transmission unit 307 to control the reception unit 305 and the transmission unit 307.

In accordance with the control signal input from the control unit 303, the reception unit 305 demultiplexes, demodulates, and decodes the reception signal received from the terminal device 1 through the transmit and receive antenna 309, and outputs information resulting from the decoding to the higher layer processing unit 301. The radio reception unit 3057 converts (down-converts) an uplink signal received through the transmit and receive antenna 309 into a signal of an intermediate frequency, removes unnecessary frequency components, controls the amplification level in such a manner as to suitably maintain a signal level, performs orthogonal demodulation based on an in-phase component and an orthogonal component of the received signal, and converts the resulting orthogonally-demodulated analog signal into a digital signal.

The radio reception unit 3057 removes a portion corresponding to the Guard Interval (GI) from the digital signal resulting from the conversion. The radio reception unit 3057 performs Fast Fourier Transform (FFT) on the signal from which the guard interval has been removed, extracts a signal in the frequency domain, and outputs the resulting signal to the demultiplexing unit 3055.

The demultiplexing unit 1055 demultiplexes the signal input from the radio reception unit 3057 into the PUCCH, the PUSCH, and the signal such as the uplink reference signal. The demultiplexing is performed based on radio resource allocation information that is determined in advance by the base station device 3 using the radio resource control unit 3011 and that is included in the uplink grant notified to each of the terminal devices 1. Furthermore, the demultiplexing unit 3055 makes a compensation of channels including the PUCCH and the PUSCH from the channel estimate input from the measurement unit 3059. Furthermore, the demultiplexing unit 3055 outputs an uplink reference signal resulting from the demultiplexing, to the measurement unit 3059.

The demodulation unit 3053 performs Inverse Discrete Fourier Transform (IDFT) on the PUSCH, acquires modulation symbols, and performs reception signal demodulation, that is, demodulates each of the modulation symbols on the PUCCH and the PUSCH, in compliance with the modulation scheme prescribed in advance, such as Binary Phase Shift Keying (BPSK), QPSK, 16 QAM, or 64 QAM, or in compliance with the modulation scheme that the base station device 3 itself notifies in advance each of the terminal devices 1 with the uplink grant. The demodulation unit 3053 demultiplexes the modulation symbols of multiple pieces of uplink data transmitted on the same PUSCH with the MIMO SM, based on the number of spatial-multiplexed sequences notified in advance with the uplink grant to each of the terminal devices 1 and information indicating the precoding to be performed on the sequences.

The decoding unit 3051 decodes coded bits of the PUCCH and the PUSCH, which have been demodulated, at the coding rate in compliance with a coding scheme prescribed in advance, the coding rate being prescribed in advance or being notified in advance with the uplink grant to the terminal device 1 by the base station device 3 itself, and outputs the decoded uplink data and uplink control information to the higher layer processing unit 101. In a case that the PUSCH is re-transmitted, the decoding unit 3051 performs the decoding with the coded bits input from the higher layer processing unit 301 and retained in an HARQ buffer, and the demodulated coded bits. The measurement unit 309 measures the channel estimate, the channel quality, and the like, based on the uplink reference signal input from the demultiplexing unit 3055, and outputs a result of the measurement to the demultiplexing unit 3055 and the higher layer processing unit 301.

The transmission unit 307 generates the downlink reference signal in accordance with the control signal input from the control unit 303, codes and modulates the HARQ indicator, the downlink control information, and the downlink data that are input from the higher layer processing unit 301, multiplexes the PHICH, the PDCCH, the EPDCCH, the PDSCH, and the downlink reference signal, and transmits a result of the multiplexing to the terminal device 1 through the transmit and receive antenna 309.

The coding unit 3071 codes the HARQ indicator, the downlink control information, and the downlink data input from the higher layer processing unit 301. The modulation unit 3073 modulates the coded bits input from the coding unit 3071, in compliance with the modulation scheme such as BPSK, QPSK, 16 QAM, or 64 QAM.

The downlink reference signal generation unit 3079 generates, as the downlink reference signal, a sequence that is already known to the terminal device 1 and that is acquired in accordance with a rule prescribed in advance based on the physical cell identifier (PCI) for identifying the base station device 3, and the like.

Depending on the number of PDSCH layers to be spatial-multiplexed, the multiplexing unit 3075 maps one of multiple pieces of downlink data transmitted on one PUSCH to one or multiple layers, and performs precoding on the one or multiple layers. The multiplexing unit 375 multiplexes the signal on the downlink physical channel and the downlink reference signal for each transmit antenna port. The multiplexing unit 375 maps the signal on the downlink physical channel and the downlink reference signal to the resource elements for each transmit antenna port.

The radio transmission unit 3077 performs Inverse Fast Fourier Transform (IFFT) on the modulation symbol resulting from the multiplexing or the like, performs the modulation in compliance with an OFDM scheme to generate an OFDM symbol, attaches the guard interval to the OFDM-modulated OFDM symbol, generates a digital signal in a baseband, converts the digital signal in the baseband into an analog signal, generates an in-phase component and an orthogonal component of an intermediate frequency from the analog signal, removes frequency components unnecessary for the intermediate frequency band, converts (up-converts) the signal of the intermediate frequency into a signal of a high frequency signal, removes unnecessary frequency components, performs power amplification, and outputs a final result to the transmit and receive antenna 309 for transmission.

(1) To be more specific, the terminal device 1 in a first aspect of the present invention may be a terminal device 1 including a transmission unit 107 which reports a first rank indicator (RI) for a first channel state information (CSI) process and reports a second RI for a second CSI process, and in a case that in a certain subframe, the first RI report collides with the second RI report, and the first RI and the second RI are reported on an identical physical uplink control channel with a first format, and the first CSI process is not a RI-reference CSI process for the second CSI process, the first RI and the second RI may be reported, and in a case that in a certain subframe, the first RI report collides with the second RI report, and the first RI and the second RI are reported on an identical physical uplink control channel with the first format, and the first CSI process is a RI-reference CSI process for the second CSI process, any of the first RI report and the second RI report may be dropped.

(2) In the above first aspect, in a case that in a certain subframe, the first RI report on the physical uplink control channel with the first format collides with the second RI report on the physical uplink control channel with the first format, the first RI and the second RI may be reported on an identical physical uplink control channel with the first format, and in a case that in a certain subframe, the first RI report on the physical uplink control channel with the first format collides with the second RI report on the physical uplink control channel with the second format, the first RI and the second RI may be reported on an identical physical uplink control channel with the first format, and in a case that in a certain subframe, the first RI report on the physical uplink control channel with the second format collides with the second RI report on the physical uplink control channel with the second format, any one of the first RI report and the second RI report may be dropped.

(3) In the above first aspect, in a case that in a certain subframe, the first RI report on the physical uplink control channel with the second format collides with the second RI report on the physical uplink control channel with the second format, and the physical uplink control channel with the first format is configured, the first RI and the second RI may be reported on an identical physical uplink control channel with the first format, and in a case that in a certain subframe, the first RI report on the physical uplink control channel with the second format collides with the second RI report on the physical uplink control channel with the second format, and the physical uplink control channel with the first format is not configured, any one of the first RI report and the second RI report may be dropped.

(4) In the above first aspect, the first format may be a PUCCH format for a prescribed number of CSI reports (e.g., fifth PUCCH format), the second format may be a PUCCH format for one CSI report (e.g., third PUCCH format).

(5) The base station device 3 in the above second aspect may be a base station device 3 including a reception unit 305 which receives first rank indicator (RI) report for a first channel state information (CSI) process from the terminal device 1 and receives second RI report for a second CSI process from the terminal device 1, and in a case that in a certain subframe, the first RI report collides with the second RI report, and the first RI and the second RI are reported on an identical physical uplink control channel (PUCCH) with a first format, and the first CSI process is not a RI-reference CSI process of the second CSI process, the base station device 3 may receive both the first RI report and the second RI report, and in a case that in a certain subframe, the first RI report collides with the second RI report, and the first RI and the second RI are reported on an identical physical uplink control channel (PUCCH) with the first format, and the first CSI process is a RI-reference CSI process for the second CSI process, the base station device 3 may receive any one of the first RI report and the second RI report.

(6) In the above second aspect, in a case that in a certain subframe, the first RI report on the physical uplink control channel (PUCCH) with the first format collides with the second RI report on the physical uplink control channel (PUCCH) with the first format, the base station 3 may receive the first RI report and the second RI report on an identical physical uplink control channel (PUCCH) with the first format, and in a case that in a certain subframe, the first RI report on the physical uplink control channel (PUCCH) with the first format collides with the second RI report on the physical uplink control channel (PUCCH) with the second format, the base station device 3 may receive the first RI report and the second RI report on an identical physical uplink control channel (PUCCH) with the first format, and in a case that in a certain subframe, the first RI report on the physical uplink control channel (PUCCH) with the second format collides with the second RI report on the physical uplink control channel (PUCCH) with the second format, the base station device 3 may receive any one of the first RI report and the second RI report.

(7) In the above second aspect, in a case that in a certain subframe, the first RI report on the physical uplink control channel (PUCCH) with the second format collides with the second RI report on the physical uplink control channel (PUCCH) with the second format, and the physical uplink control channel (PUCCH) with the first format is configured, the base station device 3 may receive the first RI report and the second RI report on an identical physical uplink control channel (PUCCH) with the first format, and in a case that in a certain subframe, the first RI report on the physical uplink control channel (PUCCH) with the second format collides with the second RI report on the physical uplink control channel (PUCCH) with the second format, and the physical uplink control channel (PUCCH) with the first format is not configured, the base station device 3 may receive any one of the first RI report and the second RI report.

(8) In the above second aspect, the first format may be a PUCCH format for a prescribed number of CSI reports (e.g., fifth PUCCH format), the second format may be a PUCCH format for one CSI report (e.g., third PUCCH format).

(9) The terminal device 1 in a third aspect of the present invention may be a terminal device 1 including a transmission unit 107 which reports channel state information (CSI) for multiple CSI processes in a first serving cell and channel state information in a second serving cell, wherein first channel state information for some of multiple CSI processes in the first serving cell is reported on a physical uplink control channel (PUCCH) with a first format, and second channel state information for the rest of multiple CSI processes in the first serving cell is reported on a physical uplink control channel with the first format, and in a case that in a certain subframe, the second channel state information report collides with the channel state information report in the second serving cell, the second channel state information and the channel state information in the second serving cell may be reported on the physical uplink control channel with a second format.

(10) In the above third aspect, in a case that in a certain subframe, the second channel state information report collides with the channel state information report in the second serving cell, and the physical uplink control channel with the second format is configured, the second channel state information and the channel state information in the second serving cell may be reported on the physical uplink control channel with the second format.

(11) In the above third aspect, the physical uplink control channel with the second format may be a physical uplink control channel for the channel state information report in the second serving cell.

(12) In the above third aspect, each of the first channel state information report, the second channel state information report, and the channel state information report in the second serving cell may be configured through RRC signaling.

(13) In the above third aspect, the first format may be a PUCCH format for one channel state information report (e.g., third PUCCH format), and the second format may be a PUCCH format for a prescribed number of channel state information reports (e.g., fifth PUCCH format).

(14) The terminal device 1 in a fourth aspect of the present invention may be a terminal device 1 including a reception unit 105 which receives first information (e.g., DCI) indicating a first physical uplink control channel (PUCCH) resource with a first format and second information (e.g., DCI) indicating a second physical uplink control channel (PUCCH) resource with a second format, and a transmission unit 107 which reports first channel state information (CSI) for some of multiple CSI processes in a first serving cell on the first physical uplink control channel and reports second channel state information for the rest of multiple CSI processes in the first serving cell on the second physical uplink control channel, and in a case that in a certain subframe, the first channel state information report on the first physical uplink control channel collides with the second channel state information report on the second physical uplink control channel, the first channel state information and the second channel state information may be reported on the second physical uplink control channel with the second format.

(15) The terminal device 1 in a fifth aspect of the present invention, the terminal device 1 according to the present embodiment may be a terminal device 1 including a reception unit 105 which receives first information (e.g., DCI) indicating a first physical uplink control channel (PUCCH) resource with a first format, second information (e.g., DCI) indicating a second physical uplink control channel resource with the first format, and third information (e.g., DCI) indicating a third physical uplink control channel resource with a second format, and a transmission unit 107 which reports first channel state information (CSI) for some of multiple CSI processes in a first serving cell on the first physical uplink control channel and reports second channel state information for the rest of multiple CSI processes in the first serving cell on the second physical uplink control channel, and in a case that in a certain subframe, the first channel state information report collides with the second channel state information report, the first channel state information and the second channel state information may be reported on the third physical uplink control channel with the second format.

(16) The base station device 3 in a sixth aspect of the present invention may be a base station device 3 including a reception unit 305 which receives a channel state information (CSI) report for multiple CSI processes in a first serving cell and a channel state information report in a second serving cell, wherein first channel state information for some of multiple CSI processes in the first serving cell is reported on a physical uplink control channel (PUCCH) with a first format, and second channel state information for the rest of multiple CSI processes in the first serving cell is reported on a physical uplink control channel with the first format, and in a case that in a certain subframe, the second channel state information report collides with the channel state information report in the second serving cell, the second channel state information and the channel state information in the second serving cell may be reported on the physical uplink control channel with a second format.

(17) In the above sixth aspect, in a case that in a certain subframe, the second channel state information report collides with the channel state information report in the second serving cell, and the physical uplink control channel with the second format is configured, the second channel state information and the channel state information in the second serving cell may be reported on the physical uplink control channel with the second format.

(18) In the above sixth aspect, the physical uplink control channel with the second format may be a physical uplink control channel for the channel state information report in the second serving cell.

(19) In the above sixth aspect, each of the first channel state information report, the second channel state information report, and the channel state information report in the second serving cell may be configured through RRC signaling.

(20) In the above sixth aspect, the first format may be a PUCCH format for one channel state information report (e.g., third PUCCH format), and the second format may be a PUCCH format for a prescribed number of channel state information reports (e.g., fifth PUCCH format).

(21) The base station device 3 in a seventh aspect of the present invention may be a base station device 3 including a transmission unit 307 which transmits first information (e.g., DCI) indicating a first physical uplink control channel (PUCCH) resource with a first format and second information (e.g., DCI) indicating a second physical uplink control channel resource with a second format, and a reception unit 305 which receives a first channel state information (CSI) report for some of multiple CSI processes in a first serving cell on the first physical uplink control channel and receives a second channel state information report for the rest of multiple CSI processes in the first serving cell on the second physical uplink control channel, and in a case that in a certain subframe, the first channel state information report on the first physical uplink control channel collides with the second channel state information report on the second physical uplink control channel, the first channel state information and the second channel state information may be reported on the second physical uplink control channel with the second format.

(22) The base station device 3 in an eighth aspect of the present invention may be a base station device 3 including a transmission unit 307 which transmits first information (e.g., DCI) indicating a first physical uplink control channel (PUCCH) resource with a first format, second information (e.g., DCI) indicating a second physical uplink control channel resource with the first format, and third information (e.g., DCI) indicating a third physical uplink control channel resource with a second format, and a reception unit 305 which receives first channel state information (CSI) for some of multiple CSI processes in a first serving cell on the first physical uplink control channel and receives second channel state information for the rest of multiple CSI processes in the first serving cell on the second physical uplink control channel, and in a case that in a certain subframe, the first channel state information report collides with the second channel state information report, the first channel state information and the second channel state information may be reported on the third physical uplink control channel with the second format.

(23) The terminal device 1 in a ninth aspect of the present invention may be a terminal device 1 including a transmission unit 107 which reports channel state information (CSI) for multiple subframe sets in a first serving cell and channel state information in a second serving cell, wherein first channel state information for some of multiple subframe sets in the first serving cell is reported on a physical uplink control channel (PUCCH) with a first format, and second channel state information for the rest of multiple subframe sets in the first serving cell is reported on a physical uplink control channel with the first format, and in a case that in a certain subframe, the second channel state information report collides with the channel state information report in the second serving cell, the second channel state information and the channel state information in the second serving cell may be reported on the physical uplink control channel with a second format.

(24) In the above ninth aspect, in a case that in a certain subframe, the second channel state information report collides with the channel state information report in the second serving cell, and the physical uplink control channel with the second format is configured, the second channel state information and the channel state information in the second serving cell may be reported on the physical uplink control channel with the second format.

(25) In the above ninth aspect, the physical uplink control channel with the second format may be a physical uplink control channel for the channel state information report in the second serving cell.

(26) In the above ninth aspect, each of the first channel state information report, the second channel state information report, and the channel state information report in the second serving cell may be configured through RRC signaling.

(27) In the above ninth aspect, the first format may be a PUCCH format for one channel state information report (e.g., third PUCCH format), and the second format may be a PUCCH format for a prescribed number of channel state information reports (e.g., fifth PUCCH format).

(28) The terminal device 1 in a tenth aspect of the present invention may be a terminal device 1 including a reception unit 105 which receives first information (e.g., DCI) indicating a first physical uplink control channel (PUCCH) resource with a first format and second information (e.g., DCI) indicating a second physical uplink control channel (PUCCH) resource with a second format, and a transmission unit 107 which reports first channel state information (CSI) for some of multiple subframe sets in a first serving cell on the first physical uplink control channel and reports second channel state information for the rest of multiple subframe sets in the first serving cell on the second physical uplink control channel, and in a case that in a certain subframe, the first channel state information report on the first physical uplink control channel collides with the second channel state information report on the second physical uplink control channel, the first channel state information and the second channel state information may be reported on the second physical uplink control channel with the second format.

(29) The terminal device 1 in an eleventh aspect of the present invention may be a terminal device 1 including a reception unit 105 which receives first information (e.g., DCI) indicating a first physical uplink control channel (PUCCH) resource with a first format, second information (e.g., DCI) indicating a second physical uplink control channel resource with the first format, and third information (e.g., DCI) indicating a third physical uplink control channel resource with a second format, and a transmission unit 107 which reports first channel state information (CSI) for some of multiple subframes sets in a first serving cell on the first physical uplink control channel and reports second channel state information for the rest of multiple subframe sets in the first serving cell on the second physical uplink control channel, and in a case that in a certain subframe, the first channel state information report collides with the second channel state information report, the first channel state information and the second channel state information may be reported on the third physical uplink control channel with the second format.

(30) The base station device 3 in a twelfth aspect of the present invention may be a base station device 3 including a reception unit 305 which receives a channel state information (CSI) report for multiple subframe sets in a first serving cell and a channel state information report in a second serving cell, wherein first channel state information for some of multiple subframe sets in the first serving cell is reported on a physical uplink control channel (PUCCH) with a first format, and second channel state information for the rest of multiple subframe sets in the first serving cell is reported on a physical uplink control channel with the first format, and in a case that in a certain subframe, the second channel state information report collides with the channel state information report in the second serving cell, the second channel state information and the channel state information in the second serving cell may be reported on the physical uplink control channel with a second format.

(31) In the above twelfth aspect, in a case that in a certain subframe, the second channel state information report collides with the channel state information report in the second serving cell, and the physical uplink control channel with the second format is configured, the second channel state information and the channel state information in the second serving cell may be reported on the physical uplink control channel with the second format.

(32) In the above twelfth aspect, the physical uplink control channel with the second format may be a physical uplink control channel for the channel state information report in the second serving cell.

(33) In the above twelfth aspect, each of the first channel state information report, the second channel state information report, and the channel state information report in the second serving cell may be configured through RRC signaling.

(34) In the above twelfth aspect, the first format may be a PUCCH format for one channel state information report (e.g., third PUCCH format), and the second format may be a PUCCH format for a prescribed number of channel state information reports (e.g., fifth PUCCH format).

(35) The base station device 3 in a thirteenth aspect of the present invention may be a base station device 3 including a transmission unit 307 which transmits first information (e.g., DCI) indicating a first physical uplink control channel (PUCCH) resource with a first format and second information (e.g., DCI) indicating a second physical uplink control channel resource with a second format, and a reception unit 305 which receives a first channel state information (CSI) report for some of multiple subframe sets in a first serving cell on the first physical uplink control channel and receives a second channel state information report for the rest of multiple subframe sets in the first serving cell on the second physical uplink control channel, and in a case that in a certain subframe, the first channel state information report on the first physical uplink control channel collides with the second channel state information report on the second physical uplink control channel, the first channel state information and the second channel state information may be reported on the second physical uplink control channel with the second format.

(36) The base station device 3 in a fourteenth aspect of the present invention may be a base station device 3 including a transmission unit 307 which transmits first information (e.g., DCI) indicating a first physical uplink control channel (PUCCH) resource with a first format, second information (e.g., DCI) indicating a second physical uplink control channel resource with the first format, and third information (e.g., DCI) indicating a third physical uplink control channel resource with a second format, and a reception unit 305 which receives first channel state information (CSI) for some of multiple subframe sets in a first serving cell on the first physical uplink control channel and receives second channel state information for the rest of multiple subframe sets in the first serving cell on the second physical uplink control channel, and in a case that in a certain subframe, the first channel state information report collides with the second channel state information report, the first channel state information and the second channel state information may be reported on the third physical uplink control channel with the second format.

This allows the uplink control information to be efficiently transmitted.

A program running on each of the base station device 3 and the terminal device 1 according to the present invention may be a program that controls a central processing unit (CPU) and the like (a program for causing a computer to operate) in such a manner as to realize the functions according to the above-described embodiments of the present invention. The information handled in these devices is temporarily stored in a Random Access Memory (RAM) while being processed. Thereafter, the information is stored in various types of Read Only Memory (ROM) such as a flash ROM and a Hard Disk Drive (HDD) and when necessary, is read by the CPU to be modified or rewritten.

Moreover, the terminal device 1 and the base station device 3 according to the above-described embodiments may be partially realized by a computer. This configuration may be realized by recording a program for realizing such control functions on a computer-readable medium and causing a computer system to read the program recorded on the recording medium for execution.

The "computer system" refers here to a computer system built into the terminal device 1 or the base station device 3, and the computer system includes an OS and hardware components such as a peripheral device. Furthermore, the "computer-readable recording medium" refers to a portable medium such as a flexible disk, a magneto-optical disk, a ROM, and a CD-ROM, and a storage device such as a hard disk built into the computer system.

Moreover, the "computer-readable recording medium" may include a medium that dynamically retains the program for a short period of time, such as a communication line that is used to transmit the program over a network such as the Internet or over a communication circuit such as a telephone circuit, and a medium that retains, in that case, the program for a fixed period of time, such as a volatile memory within the computer system which functions as a server or a client. Furthermore, the program may be configured to realize some of the functions described above, and also may be configured to be capable of realizing the functions described above in combination with a program already recorded in the computer system.

Furthermore, the base station device 3 according to the above-described embodiments can be realized as an aggregation (a device group) constituted of multiple devices. Each of devices constituting the device group may be equipped with some or all portions of each function or each functional block of the base station device 3 according to the above-described embodiments. It is only required that the device group itself include general functions or general functional blocks of the base station device 3. Furthermore, the terminal device 1 according to the above-described embodiments can communicate with the base station device as the aggregation.

Furthermore, the base station device 3 according to the above-described embodiment may be an Evolved Universal Terrestrial Radio Access Network (EUTRAN). Furthermore, the base station device 3 according to the above-described embodiments may have some or all portions of the function of a node higher than an eNodeB.

Furthermore, some or all portions of each of the terminal device 1 and the base station device 3 according to the above-described embodiment may be realized as an LSI that is a typical integrated circuit or may be realized as a chip set. The functional blocks of each of the terminal device 1 and the base station device 3 may be individually realized as a chip, or some or all of the functional blocks may be integrated into a chip. Furthermore, the circuit integration technique is not limited to the LSI, and the integrated circuit may be realized with a dedicated circuit or a general-purpose processor. Furthermore, in a case that with advances in semiconductor technology, a circuit integration technology with which an LSI is replaced appears, it is also possible to use an integrated circuit based on the technology.

Furthermore, according to the above-described embodiments, the terminal device is described as one example of a communication device, but the present invention is not limited to this, and can be applied to a fixed-type electronic apparatus installed indoors or outdoors, or a stationary-type electronic apparatus, for example, a terminal device or a communication device, such as an audio-video (AV) apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of the present invention defined by claims, and embodiments that are made by suitably combining technical means disclosed according to the different embodiments are also included in the technical scope of the present invention. Furthermore, a configuration in which a constituent element that achieves the same effect is substituted for the one that is described according to the embodiments is also included in the technical scope of the present invention.

DESCRIPTION OF REFERENCE NUMERALS 1 (1A, 1B, 1C) Terminal device
3 Base station device
101 Higher layer processing unit
103 Control unit
105 Reception unit
107 Transmission unit
301 Higher layer processing unit
303 Control unit
305 Reception unit
307 Transmission unit
1011 Radio resource control unit
1013 Scheduling information interpretation unit
1015 Channel state information report control unit
3011 Radio resource control unit
3013 Scheduling unit
3015 Channel state information report control unit

The invention claimed is:

1. A terminal device, comprising:
transmission circuitry configured to or programmed to or configured and programmed to transmit one or multiple channel state information reports for multiple subframe sets in a first serving cell, and one or multiple channel state information reports for a second serving cell, wherein a first physical uplink control channel (PUCCH) resource for transmitting one channel state information report with a first PUCCH format is configured, and a second PUCCH resource for transmitting multiple channel state information reports with a second PUCCH format is configured, and wherein in a case that in a first subframe, there is only a first channel state information report for a first subframe set in the first serving cell, the first channel state information report is transmitted on the first PUCCH resource, in a case that in a second subframe, there are the first channel state information report and a second channel state information report for a second subframe set in the first serving cell, the first channel state information report and the second channel state information report are transmitted on the second PUCCH resource, in a case that in a third subframe, there are the second channel state information report and the one or multiple channel state information reports in the second serving cell, at least one or more of the second channel state information report and the one or multiple channel state information reports for the second serving cell are transmitted on the second PUCCH resource, in a case that in the third subframe, all of the second channel state information report and the one or multiple channel state information reports for the second serving cell are not transmitted on the second PUCCH resource, one or more of the second channel state information report and the one or multiple channel state information reports for the second serving cell are transmitted on a priority basis, in a case that a first cell index of the first serving cell is smaller than a second cell index of the second serving cell, a priority for a reporting type of the second channel state information report is identical to a priority for a reporting type of a third channel state information report for the second serving cell, and a CSI process index of the second channel state information report is identical to a CSI process index of the third channel state information report, and the second channel state information report is transmitted in a higher priority than the third channel state information report, and the first cell index and the second cell index are configured by a higher layer.

2. A base station device comprising:
reception circuitry configured to or programmed to or configured and programmed to receive one or multiple channel state information reports for multiple subframe sets in a first serving cell transmitted from a terminal device, and one or multiple channel state information reports for a second serving cell transmitted from the terminal device, wherein
a first physical uplink control channel (PUCCH) resource for receiving one channel state information report with a first PUCCH format is configured, and a second PUCCH resource for receiving multiple channel state information reports with a second PUCCH format is configured, wherein in a case that in a first subframe, there is only a first channel state information report for a first subframe set in the first serving cell, the first channel state information report is received on the first PUCCH resource, in a case that in a second subframe, there are the first channel state information report and a second channel state information report for a second subframe set in the first serving cell, the first channel state information report and the second channel state information report are received on the second PUCCH resource, in a case that in a third subframe, there are the second channel state information report and the one or multiple channel state information reports in the second serving cell, at least one or more of the second channel state information report and the one or multiple channel state information reports for the second serving cell are received on the second PUCCH resource, in a case that in the third subframe, all of the second channel state information report and the one or multiple channel state information reports for the second serving cell are not received on the second PUCCH resource, one or more of the second channel state information report and the one or multiple channel state information reports for the second serving cell are received on a priority basis, in a case that a first cell index of the first serving cell is smaller than a second cell index of the second serving cell, a priority for a reporting type of the second channel state information report is identical to a priority for a reporting type of a third channel state information report for the second serving cell, a CSI process index of the second channel state information report is identical to a CSI process index of the third channel state information report, and the second channel state information report is received in a higher priority than the third channel state information report, and the first cell index and the second cell index are configured by a higher layer.

3. A communication method of a terminal device, the communication method comprising:

transmitting one or multiple channel state information reports for multiple subframe sets in a first serving cell, and one or multiple channel state information reports for a second serving cell, wherein a first physical uplink control channel (PUCCH) resource for transmitting one channel state information report with a first PUCCH format is configured, and a second PUCCH resource for transmitting multiple channel state information reports with a second PUCCH format is configured;

transmitting, in a case that in a first subframe, there is only a first channel state information report for a first subframe set in the first serving cell, the first channel state information report on the first PUCCH resource;

transmitting, in a case that in a second subframe, there are the first channel state information report and a second channel state information report for a second subframe set in the first serving cell, the first channel state information report and the second channel state information report on the second PUCCH resource, transmitting, in a case that in a third subframe, there are the second channel state information report and the one or multiple channel state information reports in the second serving cell, at least one or more of the second channel state information report and the one or multiple channel state information reports for the second serving cell on the second PUCCH resource;

transmitting, in a case that in the third subframe, all of the second channel state information report and the one or multiple channel state information reports for the second serving cell are not transmitted on the second PUCCH resource, one or more of the second channel state information report and the one or multiple channel state information reports for the second serving cell on a priority basis; and transmitting, in a case that a first cell index of the first serving cell is smaller than a second cell index of the second serving cell, a priority for a reporting type of the second channel state information report is identical to a priority for a reporting type of a third channel state information report for the second serving cell, and a CSI process index of the second channel state information report is identical to a CSI process index of the third channel state information report, the second channel state information report in a higher priority than the third channel state information report, wherein the first cell index and the second cell index are configured by a higher layer.

4. A communication method of a base station device, the communication method comprising:

receiving one or multiple channel state information reports for multiple subframe sets in a first serving cell transmitted from a terminal device, and one or multiple channel state information reports for a second serving cell transmitted from a terminal device, wherein a first physical uplink control channel (PUCCH) resource for receiving one channel state information report with a first PUCCH format is configured, and a second PUCCH resource for receiving multiple channel state information reports with a second PUCCH format is configured;

receiving, in a case that in a first subframe, there is only a first channel state information report for a first subframe set in the first serving cell, the first channel state information report on the first PUCCH resource;

receiving, in a case that in a second subframe, there are the first channel state information report and a second channel state information report for a second subframe set in the first serving cell, the first channel state information report and the second channel state information report on the second PUCCH resource;

receiving, in a case that in a third subframe, there are the second channel state information report and the one or multiple channel state information reports in the second serving cell, at least one or more of the second channel state information report and the one or multiple channel state information reports for the second serving cell on the second PUCCH resource;

receiving, in a case that in the third subframe, all of the second channel state information report and the one or multiple channel state information reports for the second serving cell are not received on the second PUCCH resource, one or more of the second channel state information report and the one or multiple channel state information reports for the second serving cell on a priority basis; and receiving, in a case that a first cell index of the first serving cell is smaller than a second cell index of the second serving cell, a priority for a reporting type of the second channel state information report is identical to a priority for a reporting type of a third channel state information report for the second serving cell, and a CSI process index of the second channel state information report is identical to a CSI process index of the third channel state information report, the second channel state information report in a higher priority than the third channel state information report, wherein the first cell index and the second cell index are configured by a higher layer.

* * * * *